United States Patent
Kanoh et al.

(10) Patent No.: US 11,778,178 B2
(45) Date of Patent: *Oct. 3, 2023

(54) ENCODER, DECODER, ENCODING METHOD, AND DECODING METHOD

(71) Applicant: Panasonic Intellectual Property Corporation of America, Torrance, CA (US)

(72) Inventors: Ryuichi Kanoh, Osaka (JP); Takahiro Nishi, Nara (JP); Tadamasa Toma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,938

(22) Filed: May 3, 2022

(65) Prior Publication Data

US 2022/0264090 A1    Aug. 18, 2022

Related U.S. Application Data

(63) Continuation of application No. 16/593,186, filed on Oct. 4, 2019, now Pat. No. 11,375,186, which is a
(Continued)

(30) Foreign Application Priority Data

May 30, 2017  (JP) ................................. 2017-106905

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/182* (2014.11); *H04N 19/186* (2014.11)

(58) Field of Classification Search
CPC .. H04N 19/117; H04N 19/176; H04N 19/182; H04N 19/186
See application file for complete search history.

(56) References Cited

U.S. PATENT DOCUMENTS

| 10,027,972 B2 | 7/2018 | Han et al. |
| 2006/0098744 A1 | 5/2006 | Huang |

(Continued)

FOREIGN PATENT DOCUMENTS

| JP | 2014-511632 A | 5/2014 |
| KR | 10-2010-0074137 A | 7/2010 |

(Continued)

OTHER PUBLICATIONS

International Search Report and Written Opinion, dated Apr. 4, 2018, for International Application No. PCT/JP2018/014362. (10 pages).

(Continued)

*Primary Examiner* — Dave Czekaj
*Assistant Examiner* — Shanika M Brumfield
(74) *Attorney, Agent, or Firm* — Seed IP Law Group LLP

(57) ABSTRACT

An encoding method includes: changing values of luma pixels in a first block and a second block to filter a first boundary between the first block and the second block, using clipping such that change amounts of the respective values are within respective luma clip widths, the luma pixels in the first block and the second block being arranged along a first line across the first boundary; and changing values of chroma pixels in a third block and a fourth block to filter a second boundary between the third block and the fourth
(Continued)

block, using clipping such that change amounts of the respective values are within respective chroma clip widths, the chroma pixels in the third block and the fourth block being arranged along a second line across the second boundary. The luma clip widths applied to the luma pixels are selected to be asymmetrical relative to the first boundary.

2 Claims, 29 Drawing Sheets

Related U.S. Application Data continuation of application No. PCT/JP2018/014362, filed on Apr. 4, 2018.

(60) Provisional application No. 62/482,314, filed on Apr. 6, 2017.

(51) Int. Cl.
*H04N 19/182* (2014.01)
*H04N 19/186* (2014.01)

(56) References Cited

U.S. PATENT DOCUMENTS

| | | |
|---|---|---|
| 2010/0220788 A1 | 9/2010 | Wittmann et al. |
| 2011/0200103 A1 | 8/2011 | Kim et al. |
| 2012/0287994 A1 | 11/2012 | Van der Auwera et al. |
| 2013/0028531 A1 | 1/2013 | Sato |
| 2013/0259141 A1 | 10/2013 | Van der Auwera et al. |
| 2013/0294525 A1 | 11/2013 | Norkin et al. |
| 2013/0329814 A1 | 12/2013 | Norkin et al. |
| 2014/0133564 A1 | 5/2014 | Lim et al. |
| 2014/0233659 A1 | 8/2014 | Narroschke et al. |
| 2016/0286219 A1 | 9/2016 | Rusanovskyy |
| 2020/0014921 A1 | 1/2020 | Ikeda |
| 2020/0021805 A1* | 1/2020 | Ko .................. H04N 19/176 |

FOREIGN PATENT DOCUMENTS

| | | |
|---|---|---|
| KR | 10-2013-0011878 A | 1/2013 |
| KR | 10-2015-0003246 A | 1/2015 |
| WO | 2012/118421 A1 | 9/2012 |
| WO | 2013/152007 A1 | 10/2013 |

OTHER PUBLICATIONS

"Information technology—High efficiency coding and media delivery in heterogeneous environments—Part 2: High efficiency video coding" International Standard, ISO/IEC 23008-2, First Edition, Dec. 1, 2013, (312 pages).

Okubo et al., "H. 265/HEVC Textbook," Impress Japan Corporation, Oct. 21, 2013. (17 pages with partial English translation).

Extended European Search Report, dated Mar. 13, 2020, for European Application No. 18780495.0-1209. (9 pages).

International Search Report and Written Opinion, dated Jun. 12, 2018, for International Application No. PCT/JP2018/014362. (10 pages).

Okubo et al., "H. 265/HEVC Textbook," Impress Japan Corporation, Oct. 21, 2013. (13 pages with partial English translation).

Korean Notification of Reason for Refusal, dated Nov. 16, 2020, for Korean Patent Application No. 10-2019-7029075. (12 pages with English translation).

Korean Notification of Reason for Refusal, dated Jul. 9, 2021, for Korean Patent Application No. 10-2021-7015583. (10 pages with English translation).

Indian Office Action, dated Jun. 14, 2022, for Indian Patent Application No. 202148042024. (6 pages).

* cited by examiner

FIG. 3

| TRANSFORM TYPE | BASIS FUNCTION $T_i(j)$, $i, j = 0, 1, \ldots, N-1$ |
|---|---|
| DCT - II | $T_i(j) = \omega_0 \cdot \sqrt{\dfrac{2}{N}} \cdot \cos\left(\dfrac{\pi \cdot i \cdot (2j+1)}{2N}\right)$ <br><br> WHERE $\omega_0 = \begin{cases} \sqrt{\dfrac{2}{N}} & i = 0 \\ 1 & i \neq 0 \end{cases}$ |
| DCT - V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$ <br><br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT - VIII | $T_i(j) = \sqrt{\dfrac{4}{2N+1}} \cdot \cos\left(\dfrac{\pi \cdot (2i+1) \cdot (2j+1)}{4N+2}\right)$ |
| DST - I | $T_i(j) = \sqrt{\dfrac{2}{N+1}} \cdot \sin\left(\dfrac{\pi \cdot (i+1) \cdot (j+1)}{N+1}\right)$ |
| DST - VII | $T_i(j) = \sqrt{\dfrac{4}{2N+1}} \cdot \sin\left(\dfrac{\pi \cdot (2i+1) \cdot (j+1)}{2N+1}\right)$ |

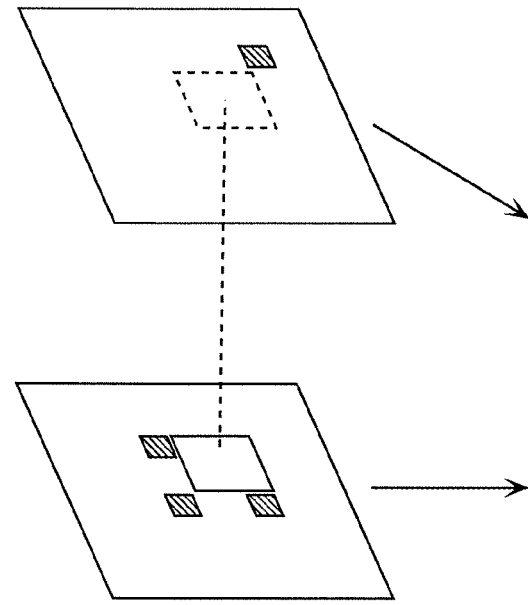

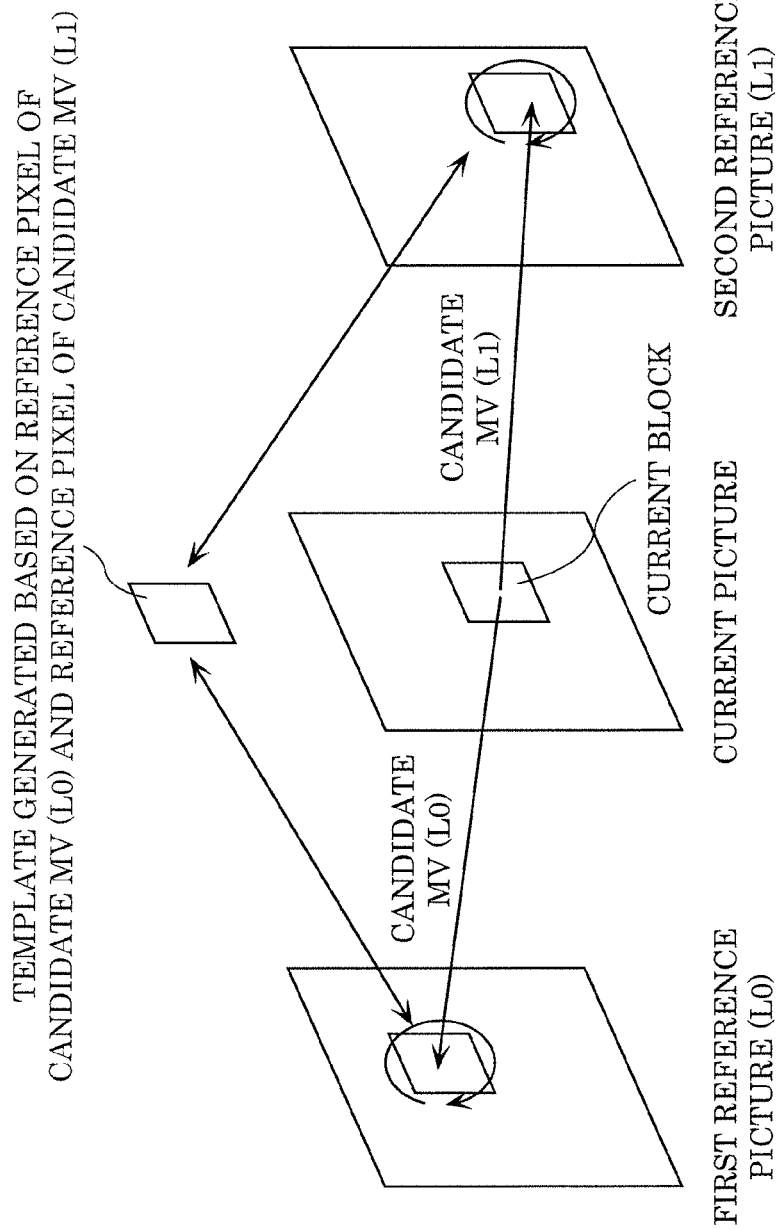

ENCODER, DECODER, ENCODING METHOD, AND DECODING METHOD

CROSS REFERENCE TO RELATED APPLICATIONS

This application is a U.S. continuation application of U.S. application Ser. No. 16/593,186 filed on Oct. 4, 2019, which is a U.S. continuation application of PCT International Patent Application Number PCT/JP2018/014362 filed on Apr. 4, 2018, claiming the benefit of priority of U.S. Provisional Application No. 62/482,314 filed on Apr. 6, 2017 and the benefit of priority of Japanese Patent Application Number 2017-106905 filed on May 30, 2017, the entire contents of which are hereby incorporated by reference.

BACKGROUND

1. Technical Field

The present disclosure relates to encoders, decoders, encoding methods, and decoding methods.

2. Description of the Related Art

A video coding standard called high-efficiency video coding (HEVC) has been standardized by Joint Collaborative Team on Video Coding (JCT-VC).

CITATION LIST

Non-patent Literature

NPL 1: H.265 (ISO/IEC 23008-2 HEVC)/HEVC (High Efficiency Video Coding)

SUMMARY

An encoder includes processing circuitry and a memory coupled to the processing circuitry. Using the memory, the processing circuitry is configured to: change values of pixels in a first block and a second block to filter a boundary between the first block and the second block, using clipping such that change amounts of the respective values do not exceed respective thresholds, the pixels in the first block and the second block being arranged along a line across the boundary. The pixels include type one pixels and type two pixels different from the type one pixels. The respective thresholds for the type one pixels in the first block and the second block are selected to be symmetrical or asymmetrical with respect to the boundary based on block sizes of the first block and the second block.

It is to be noted that these general and specific aspects may be implemented using a system, a method, an integrated circuit, a computer program, or a non-transitory computer-readable recording medium such as a CD-ROM, or any combination of systems, methods, integrated circuits, computer programs, or computer-readable recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type.

FIG. 9B is for illustrating an outline of a process for deriving a motion vector via merge mode.

FIG. 9C is a conceptual diagram for illustrating an outline of DMVR processing.

DETAILED DESCRIPTION OF THE EMBODIMENTS

Figure 1:
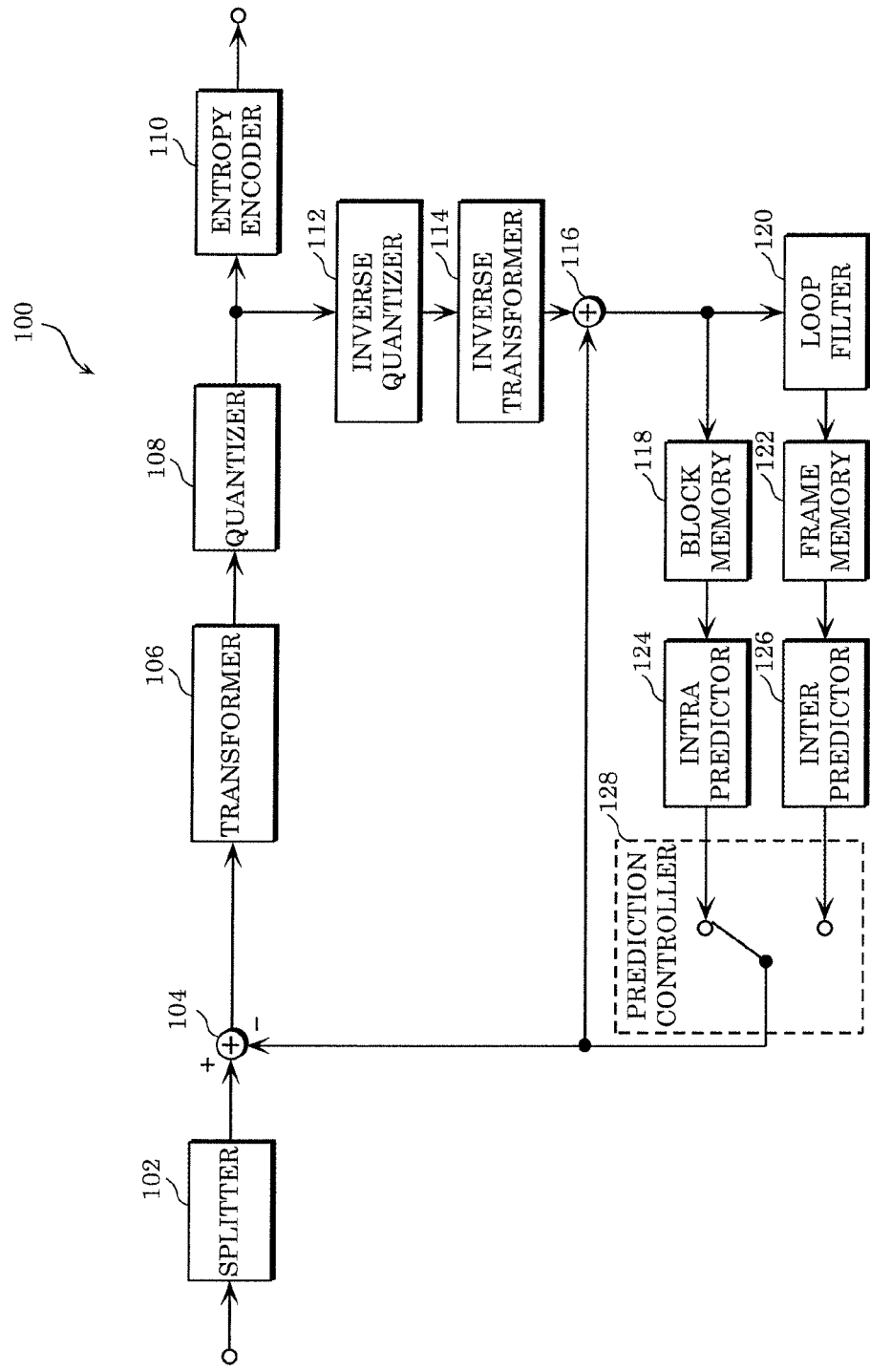
FIG. 1 is a block diagram illustrating a functional configuration of an encoder according to Embodiment 1.

In the deblocking filtering in H.265/HEVC which is one of image coding methods, a filter having a symmetrical characteristic across a block boundary is applied. With this, when an error distribution is discontinuous as in an exemplary case where a pixel located at one side across a block boundary has a small error and a pixel located at the other side across the block boundary has a large error, performing symmetrical filtering of the pixels may decrease an error reduction efficiency. Here, the error is a difference in pixel value between an original image and a reconstructed image.

An encoder according to an aspect of the present disclosure includes: a processor; and memory, wherein, using the memory, the processor: determines a filter characteristic which is asymmetrical across a block boundary; and performs deblocking filtering using the filter characteristic determined.

In this way, there is a possibility that the encoder can reduce the error by performing filtering using the asymmetrical filter characteristic across the block boundary.

For example, when determining the filter characteristic, the processor may determine the asymmetrical filter characteristic so that a pixel which is more likely to have a large error with respect to an original image is more affected by the deblocking filtering.

In this way, there is a possibility that the encoder can further reduce the error in pixel value because the encoder is capable of increasing the influence of the filtering on the pixel having the large error. In addition, there is a possibility that the encoder can reduce increase in the error in pixel value because the encoder is capable of decreasing the influence of the filtering on the pixel having the small error.

For example, when determining the filter characteristic, the processor may determine the asymmetrical filter characteristic by modifying filter coefficients of a reference filter to be asymmetrical across the block boundary.

For example, when determining the filter characteristic, the processor may determine asymmetrical weights across the block boundary, and in the deblocking filtering, the processor may perform: a filter calculation using filter coefficients; and weighting an amount of change in pixel value before and after the filter calculation using the asymmetrical weights determined.

For example, when determining the filter characteristic, the processor may determine asymmetrical offset values across the block boundary, and in the deblocking filtering, the processor may perform: a filter calculation using filter coefficients; and an addition of the asymmetrical offset values determined to pixel values after the filter calculation.

For example, when determining the filter characteristic, the processor may determine reference values which are asymmetrical across the block boundary, in the deblocking filtering, the processor may perform: a filter calculation using filter coefficients; and when an amount of change in pixel value before and after the filter calculation exceeds a corresponding one of the reference values, clipping of the amount of change to the reference value.

For example, when determining the filter characteristic, the processor may set conditions for determining whether the deblocking filtering is to be performed, the conditions being asymmetrical across the block boundary.

A decoder according to an aspect of the present disclosure includes: a processor; and memory, wherein, using the memory, the processor: determines a filter characteristic which is asymmetrical across a block boundary; and performs deblocking filtering using the filter characteristic determined.

In this way, there is a possibility that the decoder can reduce the error by performing filtering using the asymmetrical filter characteristic across the block boundary.

For example, when determining the filter characteristic, the processor may determine the asymmetrical filter characteristic so that a pixel which is more likely to have a large error with respect to an original image is more affected by the deblocking filtering.

In this way, there is a possibility that the decoder can further reduce the error in pixel value because the decoder is capable of increasing the influence of the filtering on the pixel having the large error. In addition, there is a possibility that the decoder can reduce increase in the error in pixel value because the decoder is capable of decreasing the influence of the filtering on the pixel having the small error.

For example, when determining the filter characteristic, the processor may determine the asymmetrical filter characteristic by modifying filter coefficients of a reference filter to be asymmetrical across the block boundary.

For example, when determining the filter characteristic, the processor may determine asymmetrical weights across the block boundary, and in the deblocking filtering, the processor may perform: a filter calculation using filter coefficients; and weighting an amount of change in pixel value before and after the filter calculation using the asymmetrical weights determined.

For example, when determining the filter characteristic, the processor may determine asymmetrical offset values across the block boundary, and in the deblocking filtering, the processor may perform: a filter calculation using filter coefficients; and an addition of the asymmetrical offset values determined to pixel values after the filter calculation.

For example, when determining the filter characteristic, the processor may determine reference values which are asymmetrical across the block boundary, in the deblocking filtering, the processor may perform: a filter calculation using filter coefficients; and when an amount of change in pixel value before and after the filter calculation exceeds a corresponding one of the reference values, clipping of the amount of change to the reference value.

For example, when determining the filter characteristic, the processor may set conditions for determining whether the deblocking filtering is to be performed, the conditions being asymmetrical across the block boundary.

An encoding method according to an aspect of the present disclosure includes: determining a filter characteristic which is asymmetrical across a block boundary; and performing deblocking filtering using the filter characteristic determined.

In this way, there is a possibility that the error can be reduced by performing the encoding method involving filtering using the asymmetrical filter characteristic across the block boundary.

A decoding method according to an aspect of the present disclosure includes: determining a filter characteristic which is asymmetrical across a block boundary; and performing deblocking filtering using the filter characteristic determined.

In this way, there is a possibility that the error can be reduced by performing the decoding method involving filtering using the asymmetrical filter characteristic across the block boundary.

An encoder according to an aspect of the present disclosure includes: a processor; and memory, wherein, using the memory, the processor: determines a filter characteristic which is asymmetrical across a block boundary, based on pixel values across the block boundary; and performs deblocking filtering using the filter characteristic determined.

In this way, there is a possibility that the encoder can reduce the error by performing filtering using the asymmetrical filter characteristic across the block boundary. In addition, the encoder is capable of determining an appropriate filter characteristic based on the pixel values across the block boundary.

For example, when determining the filter characteristic, the processor may determine the filter characteristic based on a difference between the pixel values.

For example, when determining the filter characteristic, the processor may increase a difference in the filter characteristic across the block boundary with increase in difference in pixel value.

In this way, there is a possibility that the encoder can prevent unnecessary smoothing from being performed when, for example, a block boundary coincides with the edge of an object in an image.

For example, when determining the filter characteristic, the processor: may compare the difference between the pixel values with a threshold value based on a quantization parameter; and increase the difference in the filter characteristic across the boundary more significantly when the difference between the pixel values is larger than the threshold value than when the difference between the pixel values is smaller than the threshold value.

In this way, the encoder is capable of determining the filter characteristic with consideration of the influence on the error in quantization parameter.

For example, when determining the filter characteristic, the processor: may decrease a difference in the filter characteristic across the block boundary with increase in difference in pixel value.

In this way, there is a possibility that the decoder can reduce decrease in smoothing effect by the asymmetry when a block boundary is subjectively noticeable, thereby reducing the decrease in subjective image quality.

For example, when determining the filter characteristic, the processor: may determine the filter characteristic based on a variance of the pixel values.

A decoder according to an aspect of the present disclosure includes: a processor; and memory, wherein, using the memory, the processor: determines a filter characteristic which is asymmetrical across a block boundary, based on pixel values across the block boundary; and performs deblocking filtering using the filter characteristic determined.

In this way, there is a possibility that the decoder can reduce the error by performing filtering using the asymmetrical filter characteristic across the block boundary. In addition, there is a possibility that the decoder can determine an appropriate filter characteristic based on the pixel values across the block boundary.

For example, when determining the filter characteristic, the processor may determine the filter characteristic based on a difference between the pixel values.

For example, when determining the filter characteristic, the processor may increase a difference in the filter characteristic across the block boundary with increase in difference in pixel value.

In this way, there is a possibility that the decoder can further reduce the error in pixel value because the decoder is capable of increasing the influence of the filtering on the pixel having the large error. In addition, there is a possibility that the decoder can reduce increase in the error in pixel value because the decoder is capable of decreasing the influence of the filtering on the pixel having the small error.

For example, when determining the filter characteristic, the processor: may compare the difference between the pixel values with a threshold value based on a quantization parameter; and increase the difference in the filter characteristic across the boundary more significantly when the difference between the pixel values is larger than the threshold value than when the difference between the pixel values is smaller than the threshold value.

In this way, the decoder is capable of determining the filter characteristic with consideration of the influence on the error in quantization parameter.

For example, when determining the filter characteristic, the processor: may decrease a difference in the filter characteristic across the block boundary with increase in difference in pixel value.

In this way, there is a possibility that the decoder can prevent unnecessary smoothing from being performed when, for example, a block boundary coincides with the edge of an object in an image.

For example, when determining the filter characteristic, the processor: may determine the filter characteristic based on a variance of the pixel values.

An encoding method according to an aspect of the present disclosure includes: determining a filter characteristic which is asymmetrical across a block boundary, based on pixel values across the block boundary; and performing deblocking filtering using the filter characteristic determined.

In this way, there is a possibility that the error can be reduced by performing the encoding method involving filtering using the asymmetrical filter characteristic across the block boundary. In addition, the encoding method makes it possible to determine an appropriate filter characteristic based on the difference between the pixel values across the block boundary.

A decoding method according to an aspect of the present disclosure includes: determining a filter characteristic which is asymmetrical across a block boundary, based on pixel values across the block boundary; and performing deblocking filtering using the filter characteristic determined.

In this way, there is a possibility that the error can be reduced by performing the decoding method involving filtering using the asymmetrical filter characteristic across the block boundary. In addition, the decoding method makes it possible to determine an appropriate filter characteristic based on the difference between the pixel values across the block boundary.

An encoder according to an aspect of the present disclosure includes: a processor; and memory, wherein, using the memory, the processor: determines a filter characteristic which is asymmetrical across a block boundary, based on an angle between the block boundary and a prediction direction in intra prediction; and performs deblocking filtering using the filter characteristic determined.

In this way, there is a possibility that the encoder can reduce the error by performing filtering using the asymmetrical filter characteristic across the block boundary. In addition, the encoder is capable of determining an appropriate filter characteristic based on the angle between the block boundary and the prediction direction in intra prediction.

For example, when determining the filter characteristic, the processor may increase a difference in the filter characteristic across the block boundary when the angle is closer to a vertical axis.

In this way, there is a possibility that the encoder can further reduce the error in pixel value because the encoder is capable of increasing the influence of the filtering on the pixel having the large error. In addition, there is a possibility that the encoder can reduce increase in the error in pixel value because the encoder is capable of decreasing the influence of the filtering on the pixel having the small error.

For example, when determining the filter characteristic, the processor may decrease a difference in the filter characteristic across the block boundary when the angle is closer to a horizontal axis.

In this way, there is a possibility that the encoder can further reduce the error in pixel value because the encoder is capable of increasing the influence of the filtering on the pixel having the large error. In addition, there is a possibility that the encoder can reduce increase in the error in pixel value because the encoder is capable of decreasing the influence of the filtering on the pixel having the small error.

A decoder according to an aspect of the present disclosure includes: a processor; and memory, wherein, using the memory, the processor: determines a filter characteristic which is asymmetrical across a block boundary, based on an angle between the block boundary and a prediction direction in intra prediction; and performs deblocking filtering using the filter characteristic determined.

In this way, there is a possibility that the decoder can reduce the error by performing filtering using the asymmetrical filter characteristic across the block boundary. In addition, there is a possibility that the decoder can determine an appropriate filter characteristic based on the angle between the block boundary and the prediction direction in intra prediction.

For example, when determining the filter characteristic, the processor may increase a difference in the filter characteristic across the block boundary when the angle is closer to a vertical axis.

In this way, there is a possibility that the decoder can further reduce the error in pixel value because the decoder is capable of increasing the influence of the filtering on the pixel having the large error. In addition, there is a possibility that the decoder can reduce increase in the error in pixel value because the decoder is capable of decreasing the influence of the filtering on the pixel having the small error.

For example, when determining the filter characteristic, the processor may decrease a difference in the filter characteristic across the block boundary when the angle is closer to a horizontal axis.

In this way, there is a possibility that the decoder can further reduce the error in pixel value because the decoder is capable of increasing the influence of the filtering on the pixel having the large error. In addition, there is a possibility that the decoder can reduce increase in the error in pixel value because the decoder is capable of decreasing the influence of the filtering on the pixel having the small error.

An encoding method according to an aspect of the present disclosure includes: determining a filter characteristic which is asymmetrical across a block boundary, based on an angle between the block boundary and a prediction direction in intra prediction; and performing deblocking filtering using the filter characteristic determined.

In this way, there is a possibility that the error can be reduced by performing the encoding method involving filtering using the asymmetrical filter characteristic across the block boundary. In addition, the encoding method makes it possible to determine an appropriate filter characteristic based on the angle between the block boundary and the prediction direction in intra prediction.

A decoding method according to an aspect of the present disclosure includes: determining a filter characteristic which is asymmetrical across a block boundary, based on an angle between the block boundary and a prediction direction in intra prediction; and performing deblocking filtering using the filter characteristic determined.

In this way, there is a possibility that the error can be reduced by performing the decoding method involving filtering using the asymmetrical filter characteristic across the block boundary. In addition, the decoding method makes it possible to determine an appropriate filter characteristic based on the angle between the block boundary and the prediction direction in intra prediction.

An encoder according to an aspect of the present disclosure includes: a processor; and memory, wherein, using the memory, the processor: determines a filter characteristic which is asymmetrical across a block boundary, based on a position of a current pixel in a block; and performs, on the current pixel, deblocking filtering using the filter characteristic determined.

In this way, there is a possibility that the encoder can reduce the error by performing filtering using the asymmetrical filter characteristic across the block boundary. In addition, the encoder is capable of determining an appropriate filter characteristic based on the position of the current pixel in the block.

For example, when determining the filter characteristic, the processor may determine the filter characteristic so that a pixel which is more distant from a reference pixel for intra prediction is more affected by the deblocking filtering.

In this way, there is a possibility that the encoder can further reduce the error in pixel value because the encoder is capable of increasing the influence of the filtering on the pixel having the large error. In addition, there is a possibility that the encoder can reduce increase in the error in pixel value because the encoder is capable of decreasing the influence of the filtering on the pixel having the small error.

For example, when determining the filter characteristic, the processor may determine the filter characteristic so that a lower-right pixel is more affected by the deblocking filtering than an upper-left pixel.

In this way, there is a possibility that the encoder can further reduce the error in pixel value because the encoder is capable of increasing the influence of the filtering on the pixel having the large error. In addition, there is a possibility that the encoder can reduce increase in the error in pixel value because the encoder is capable of decreasing the influence of the filtering on the pixel having the small error.

A decoder according to an aspect of the present disclosure includes: a processor; and memory, wherein, using the memory, the processor: determines a filter characteristic which is asymmetrical across a block boundary, based on a position of a current pixel in a block; and performs, on the current pixel, deblocking filtering using the filter characteristic determined.

In this way, there is a possibility that the decoder can reduce the error by performing filtering using the asymmetrical filter characteristic across the block boundary. In addition, the decoder is capable of determining an appropriate filter characteristic based on the position of the current pixel in the block.

For example, when determining the filter characteristic, the processor may determine the filter characteristic so that a pixel which is more distant from a reference pixel for intra prediction is more affected by the deblocking filtering.

In this way, there is a possibility that the decoder can further reduce the error in pixel value because the decoder is capable of increasing the influence of the filtering on the pixel having the large error. In addition, there is a possibility that the decoder can reduce increase in the error in pixel value because the decoder is capable of decreasing the influence of the filtering on the pixel having the small error.

For example, when determining the filter characteristic, the processor may determine the filter characteristic so that a lower-right pixel is more affected by the deblocking filtering than an upper-left pixel.

In this way, there is a possibility that the decoder can further reduce the error in pixel value because the decoder is capable of increasing the influence of the filtering on the pixel having the large error. In addition, there is a possibility that the decoder can reduce increase in the error in pixel value because the decoder is capable of decreasing the influence of the filtering on the pixel having the small error.

An encoding method according to an aspect of the present disclosure includes: determining a filter characteristic which is asymmetrical across a block boundary, based on a position of a current pixel in a block; and performing deblocking filtering using the filter characteristic determined.

In this way, there is a possibility that the error can be reduced by performing the encoding method involving filtering using the asymmetrical filter characteristic across the block boundary. In addition, the encoding method makes it possible to determine an appropriate filter characteristic based on the position of the current pixel in the block.

A decoding method according to an aspect of the present disclosure includes: determining a filter characteristic which is asymmetrical across a block boundary, based on a position of a current pixel in a block; and performing deblocking filtering using the filter characteristic determined.

In this way, there is a possibility that the error can be reduced by performing the decoding method involving filtering using the asymmetrical filter characteristic across the block boundary. In addition, the decoding method makes it possible to determine an appropriate filter characteristic based on the position of the current pixel in the block.

An encoder according to an aspect of the present disclosure includes: a processor; and memory, wherein, using the memory, the processor: determines a filter characteristic which is asymmetrical across a block boundary, based on a quantization parameter; and performs deblocking filtering using the filter characteristic determined.

In this way, there is a possibility that the encoder can reduce the error by performing filtering using the asymmetrical filter characteristic across the block boundary. Furthermore, the encoder is capable of determining an appropriate filter characteristic based on a quantization parameter.

For example, when determining the filter characteristic, the processor may determine the filter characteristic so that influence of the deblocking filtering becomes larger as a quantization parameter becomes larger.

In this way, there is a possibility that the encoder can further reduce the error in pixel value because the encoder is capable of increasing the influence of the filtering on the pixel having the large error. In addition, there is a possibility that the encoder can reduce increase in the error in pixel value because the encoder is capable of decreasing the influence of the filtering on the pixel having the small error.

For example, when determining the filter characteristic, the processor may determine the filter characteristic so that change in influence of filtering with changing quantization parameter for an upper-left pixel becomes larger than change in influence of filtering with changing quantization parameter for a lower-right pixel.

In this way, there is a possibility that the encoder can further reduce the error in pixel value because the encoder is capable of increasing the influence of the filtering on the pixel having the large error.

A decoder according to an aspect of the present disclosure includes: a processor; and memory, wherein, using the memory, the processor: determines a filter characteristic which is asymmetrical across a block boundary, based on a quantization parameter; and performs deblocking filtering using the filter characteristic determined.

In this way, there is a possibility that the decoder can reduce the error by performing filtering using the asymmetrical filter characteristic across the block boundary. Furthermore, the decoder is capable of determining an appropriate filter characteristic based on a quantization parameter.

For example, when determining the filter characteristic, the processor may determine the filter characteristic so that influence of the deblocking filtering becomes larger as a quantization parameter becomes larger.

In this way, there is a possibility that the decoder can further reduce the error in pixel value because the decoder is capable of increasing the influence of the filtering on the pixel having the large error. In addition, there is a possibility that the decoder can reduce increase in the error in pixel value because the decoder is capable of decreasing the influence of the filtering on the pixel having the small error.

For example, when determining the filter characteristic, the processor may determine the filter characteristic so that change in influence of filtering with changing quantization parameter for an upper-left pixel becomes larger than change in influence of filtering with changing quantization parameter for a lower right pixel.

In this way, there is a possibility that the decoder can further reduce the error in pixel value because the decoder is capable of increasing the influence of the filtering on the pixel having the large error.

An encoding method according to an aspect of the present disclosure may include: determining a filter characteristic which is asymmetrical across a block boundary, based on a quantization parameter; and performing deblocking filtering using the filter characteristic determined.

In this way, there is a possibility that the error can be reduced by performing the encoding method involving filtering using the asymmetrical filter characteristic across the block boundary. Furthermore, the encoding method makes it possible to determine an appropriate filter characteristic based on a quantization parameter.

A decoding method according to an aspect of the present disclosure may include: determining a filter characteristic which is asymmetrical across a block boundary, based on a quantization parameter; and performing deblocking filtering using the filter characteristic determined.

In this way, there is a possibility that the error can be reduced by performing the decoding method involving filtering using the asymmetrical filter characteristic across the block boundary. Furthermore, the decoding method makes it possible to determine an appropriate filter characteristic based on a quantization parameter.

It is to be noted that these general and specific aspects may be implemented using a system, a method, an integrated circuit, a computer program, or a non-transitory computer-readable recording medium such as a CD-ROM, or any combination of systems, methods, integrated circuits, computer programs, or computer-readable recording media.

Hereinafter, embodiments are described in detail with reference to the drawings.

It is to be noted that the embodiments described below each show a general or specific example. The numerical values, shapes, materials, constituent elements, the arrangement and connection of the constituent elements, steps, order of the steps, etc., indicated in the following embodiments are mere examples, and therefore are not intended to limit the scope of the claims. Therefore, among the constituent elements in the following embodiments, those not recited in any of the independent claims defining the most generic inventive concepts are described as optional constituent elements.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
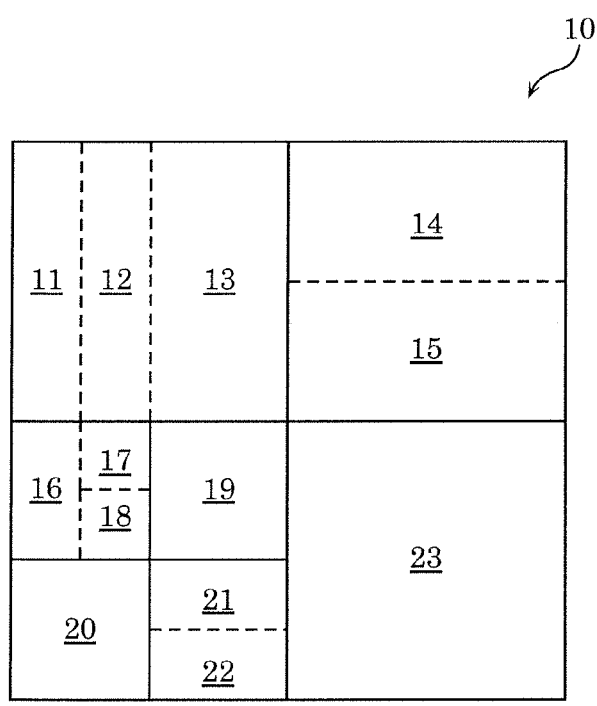
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, C=5D+A). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
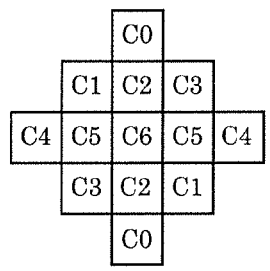
FIG. 4A illustrates one example of a filter shape used in ALF.
Figure 4B:
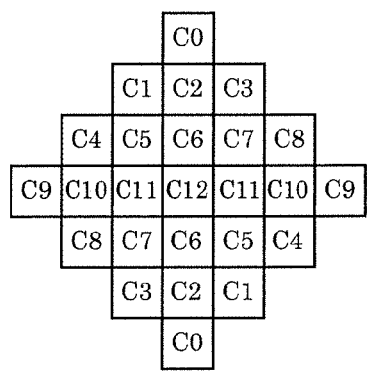
FIG. 4B illustrates another example of a filter shape used in ALF.
Figure 4C:
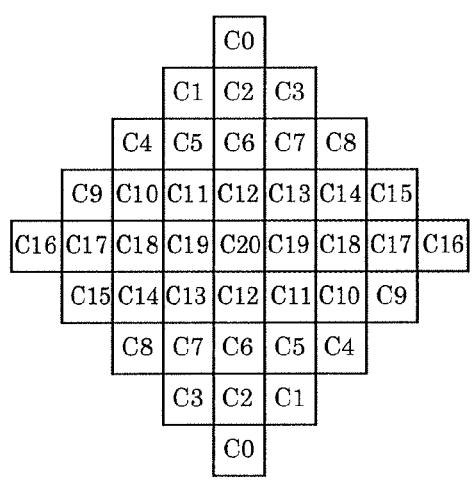
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) are signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPTL 1).

Figure 5A:
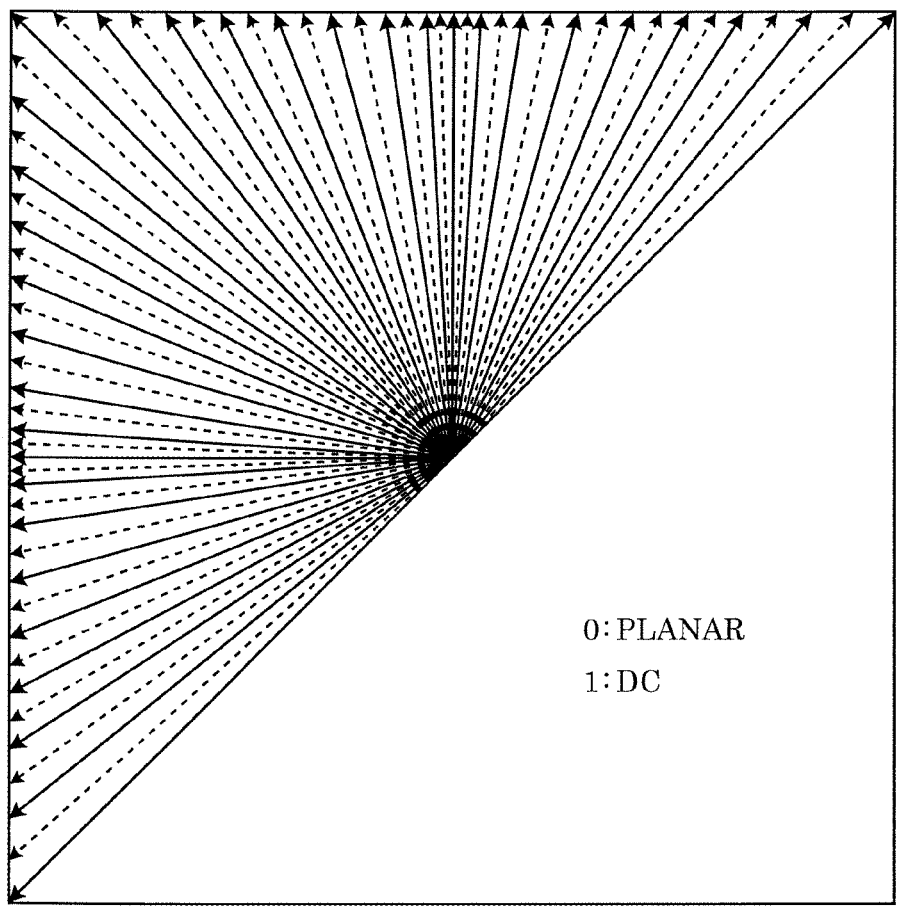
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
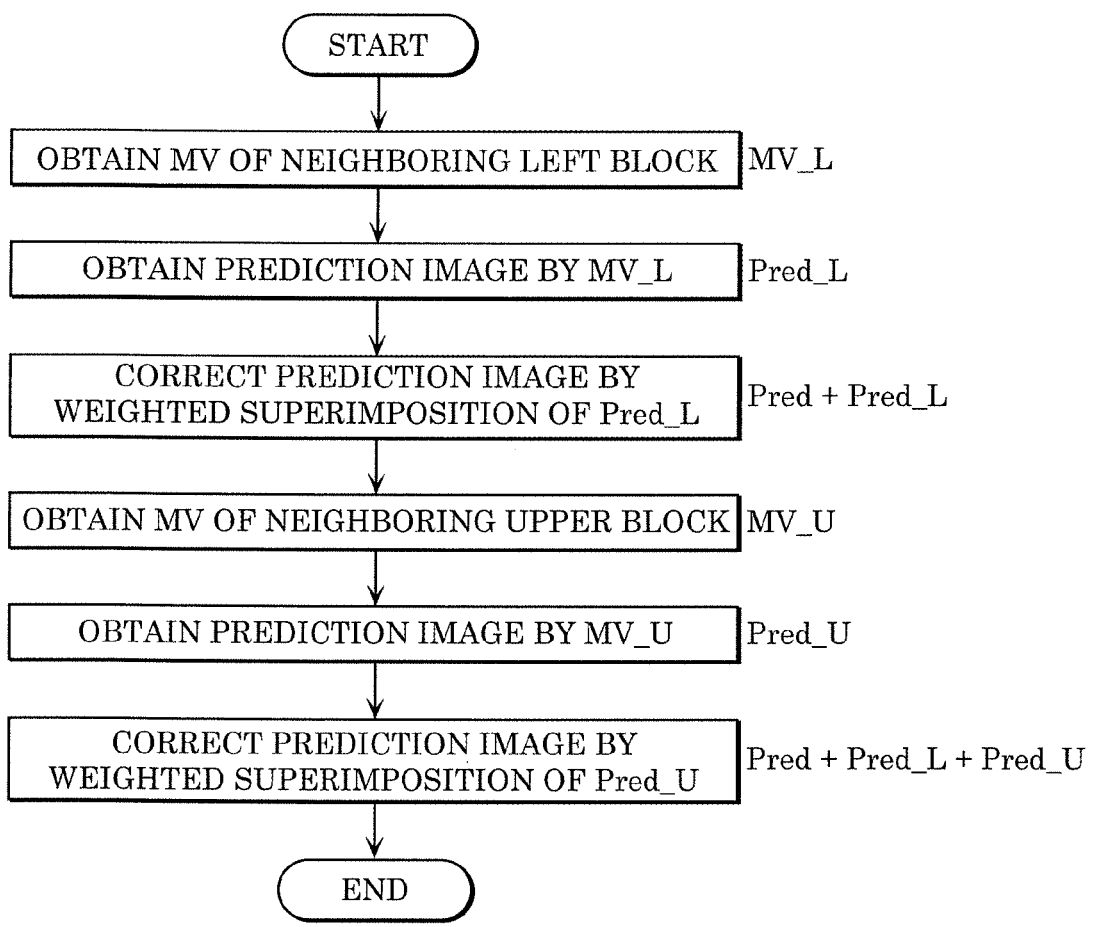
FIG. 5B is a flow chart for illustrating an outline of a prediction image correction process performed via OBMC processing.
Figure 5C:
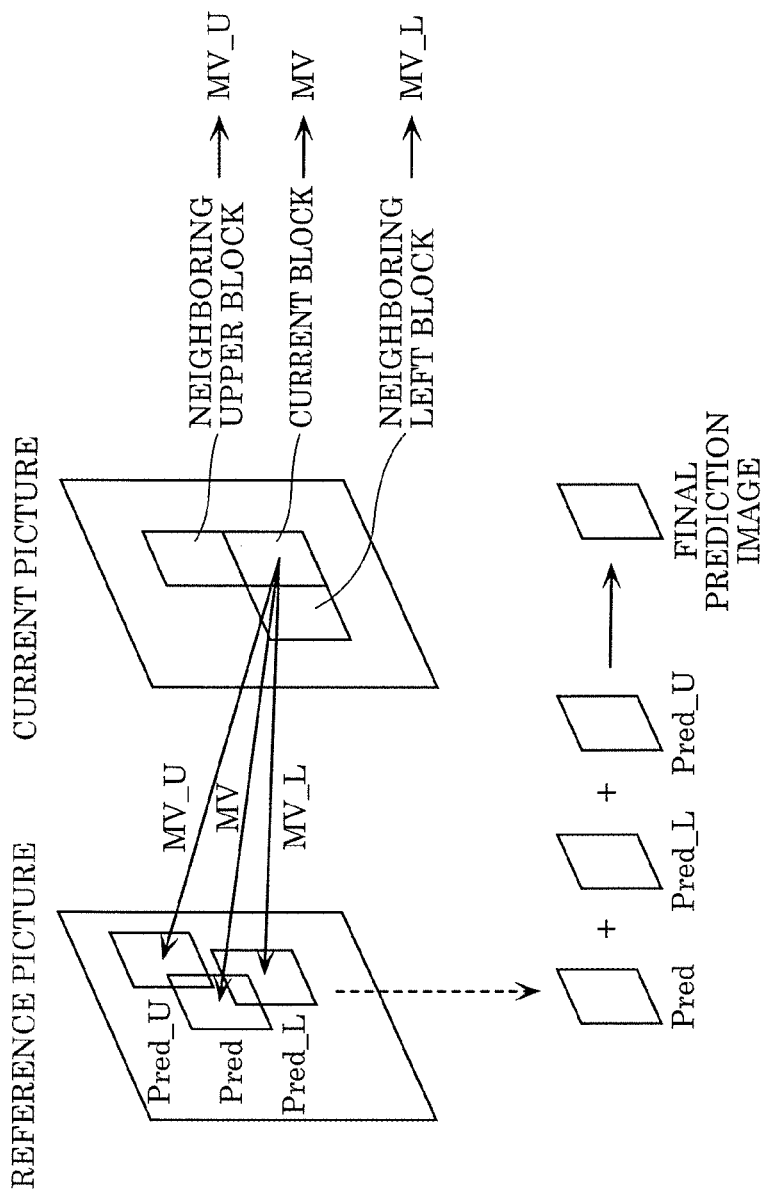
FIG. 5C is a conceptual diagram for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
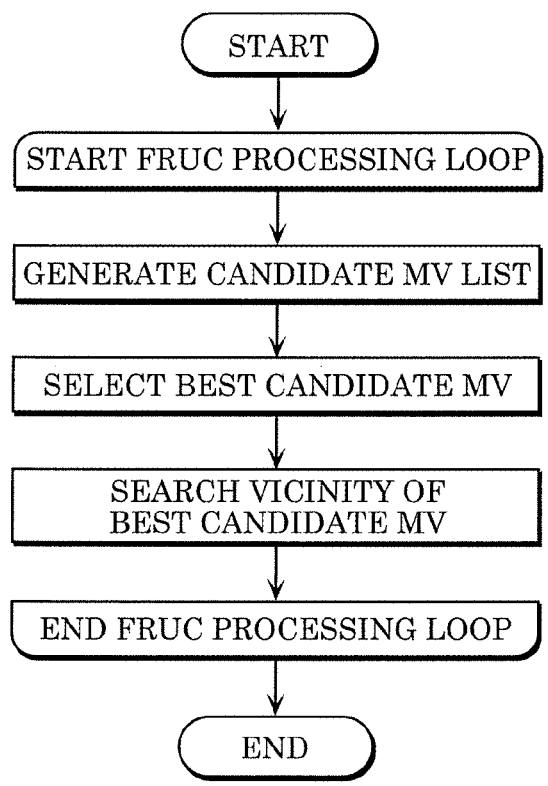
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

Figure 6:
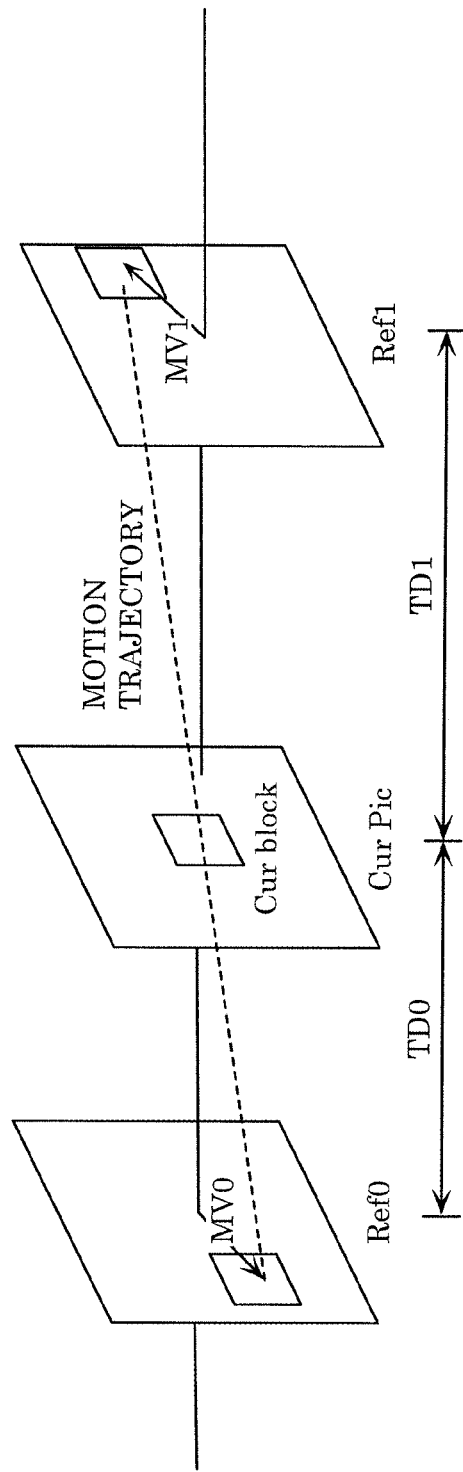
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

Figure 7:
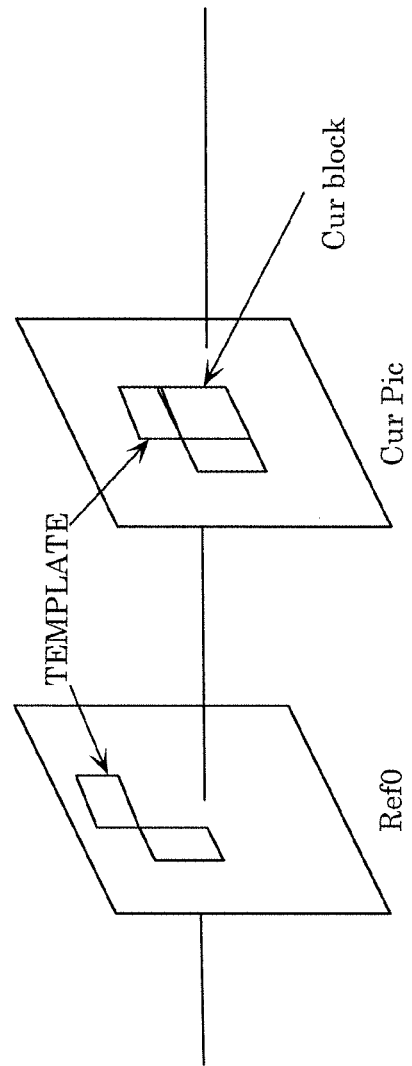
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
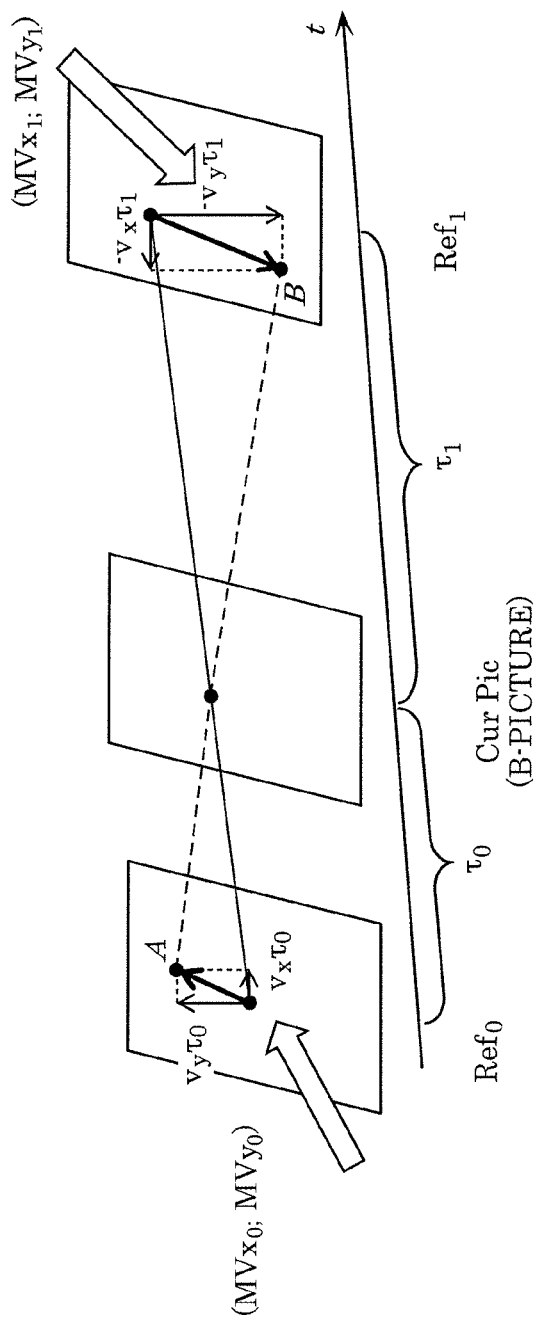
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures ($Ref_0$, $Ref_1$). ($MVx_0$, $MVy_0$) denotes a motion vector corresponding to reference picture $Ref_0$, and ($MVx_1$, $MVy_1$) denotes a motion vector corresponding to reference picture $Ref_1$.

Here, under the assumption of uniform linear motion exhibited by velocity vector $(v_x, v_y)$, ($MVx_0$, $MVy_0$) and ($MVx_1$, $MVy_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
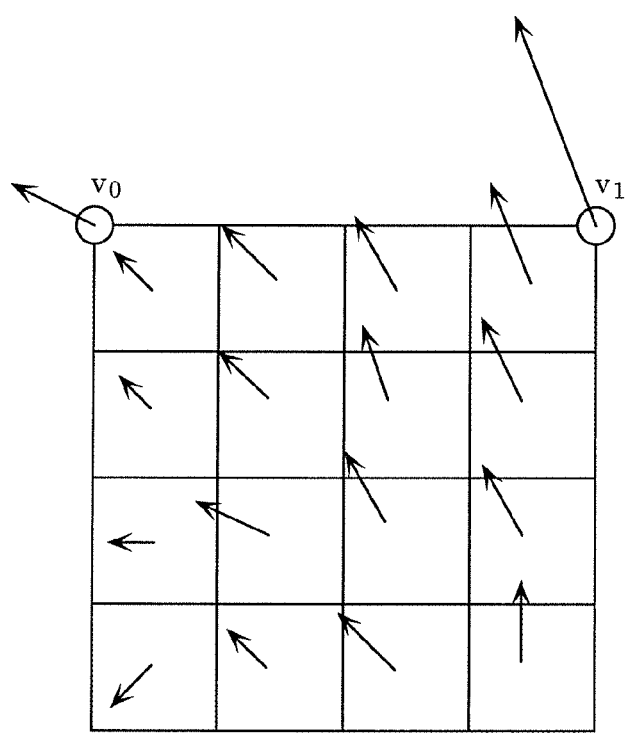
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
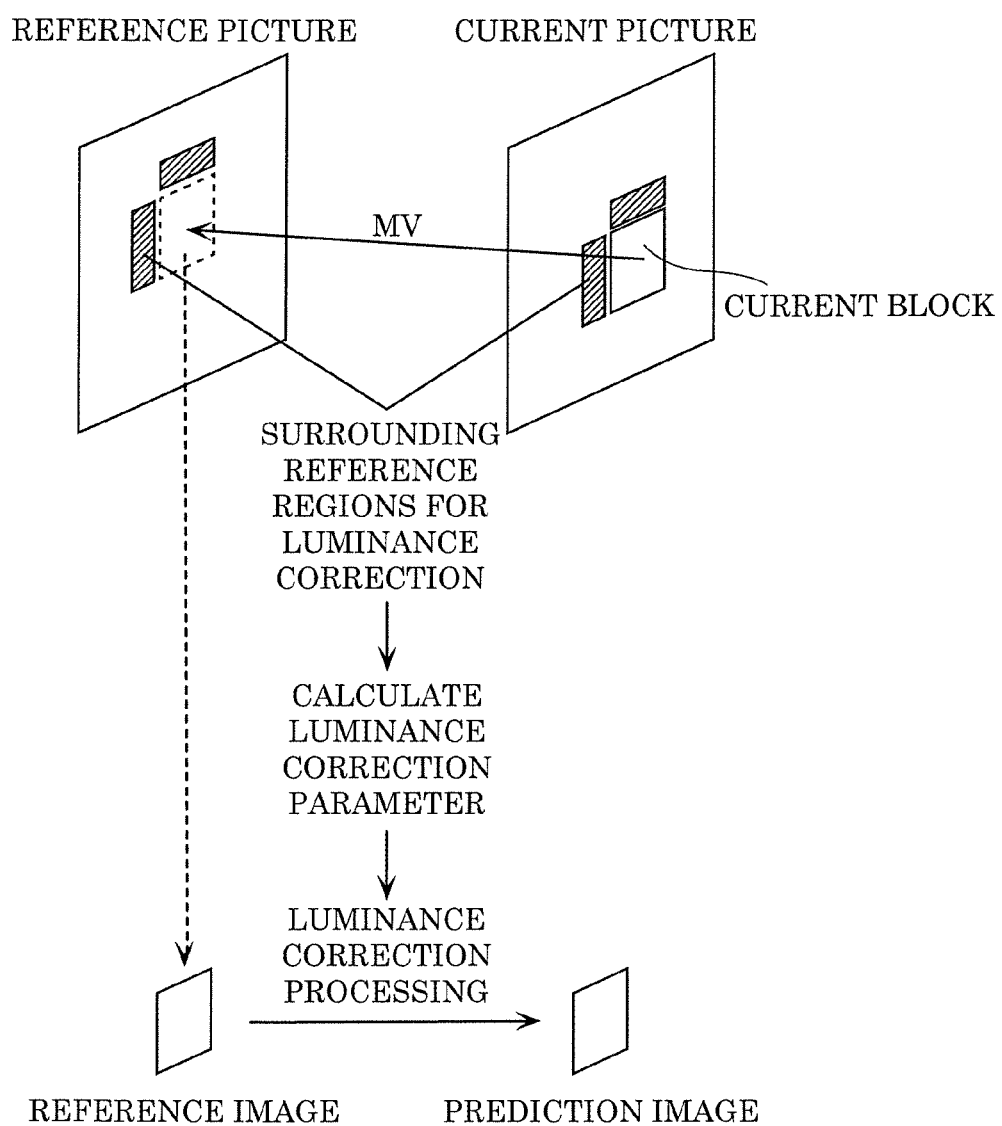
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
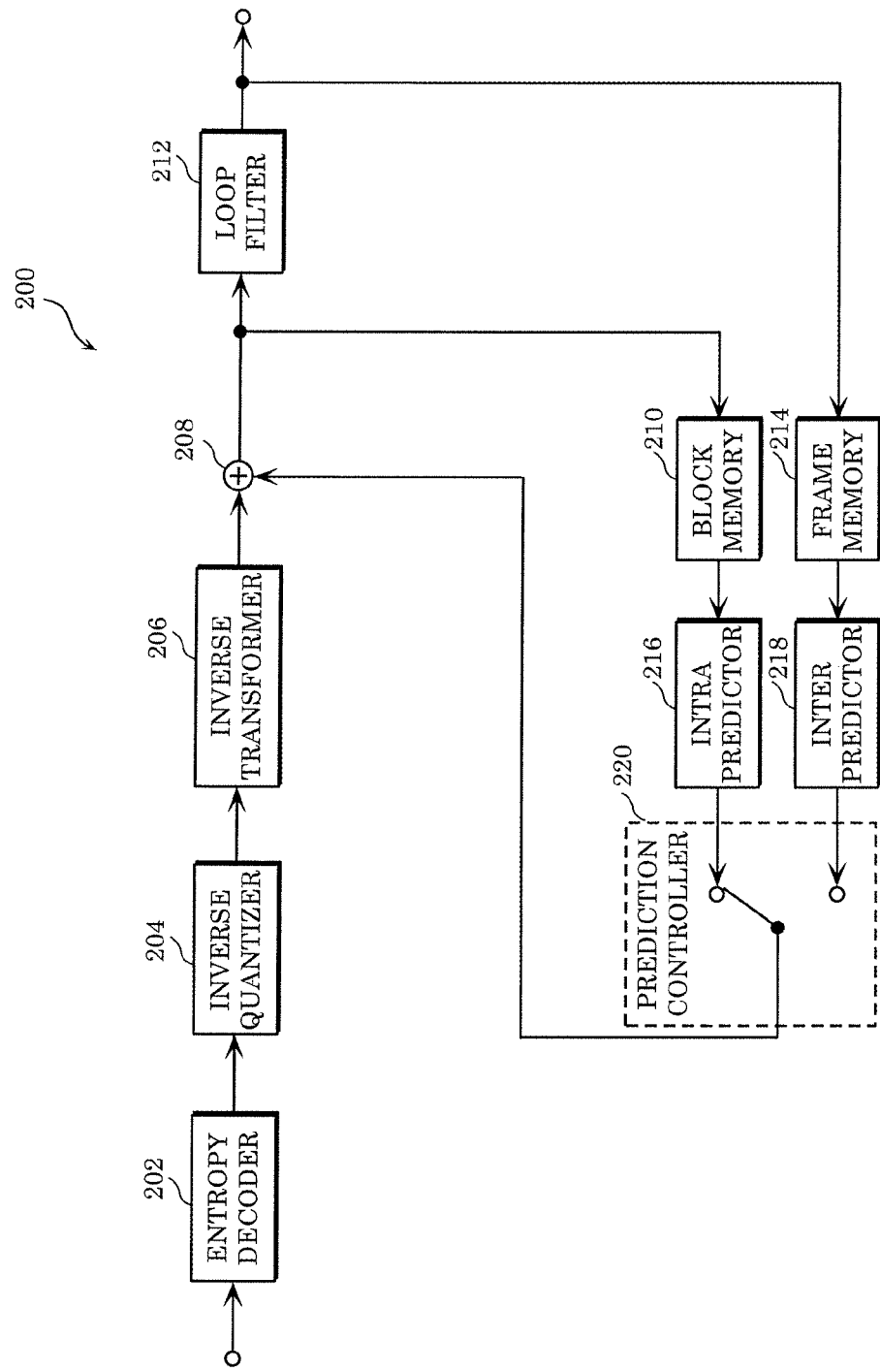
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[Deblocking Filtering]

Next, deblocking filtering performed in encoder 100 and decoder 200 configured as described above are described specifically with reference to the drawings. It is to be noted that operations performed by loop filter 120 included in encoder 100 are mainly described below, and loop filter 212 included in decoder 200 performs similar operations.

As described above, when encoding an image, encoder 100 calculates a prediction error by subtracting, from an original signal, a prediction signal which is generated by intra predictor 124 or inter predictor 126. Encoder 100 generates quantized coefficients by performing an orthogonal transform process and a quantization process on a prediction error. Furthermore, encoder 100 restores the prediction error by performing inverse quantization and inverse orthogonal transform on the resulting quantized coefficients. Here, a quantization process is irreversible processing, and thus the restored prediction error has an error (quantization error) from the pre-transform prediction error.

Deblocking filtering performed by loop filter 120 is a kind of filtering performed with an aim to reduce the quantization error. Deblocking filtering is applied to block boundaries to remove block noise. It is to be noted that deblocking filtering is also simply referred to as filtering hereinafter.

Figure 11:
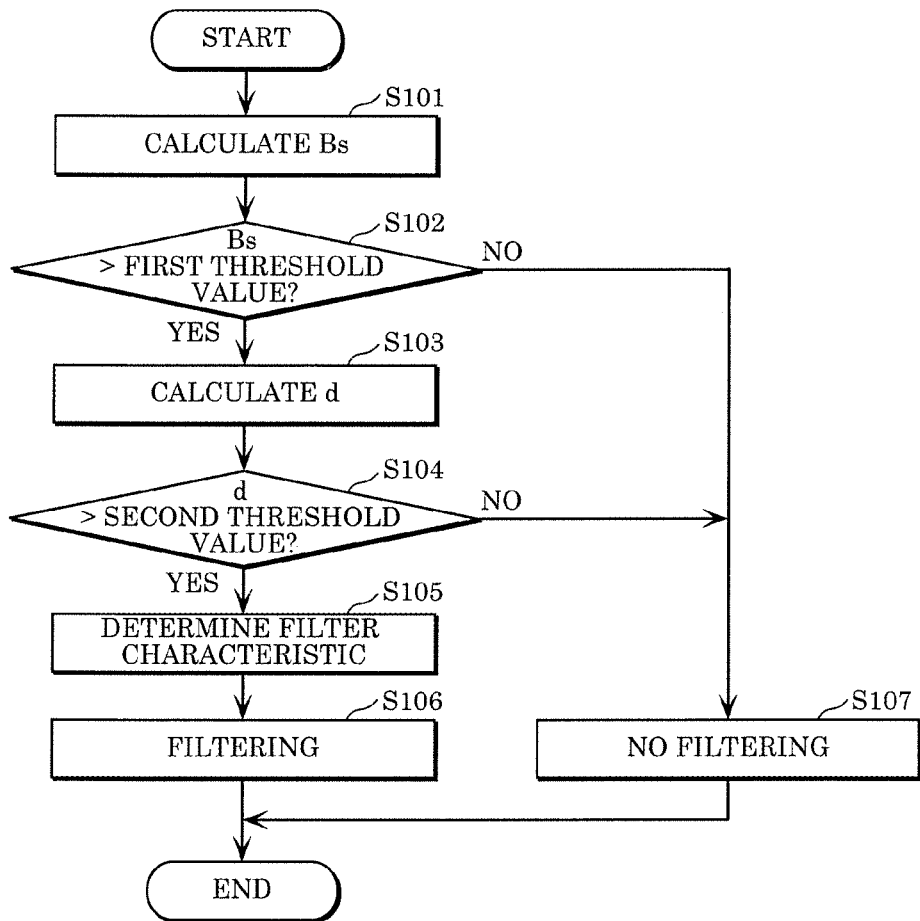
FIG. 11 is a flowchart of deblocking filtering according to Embodiment 1.

FIG. 11 is a flowchart indicating an example of deblocking filtering performed by loop filter 120. For example, processing indicated in FIG. 11 is performed for each of block boundaries.

First, loop filter 120 calculates a block boundary strength (Bs) in order to determine a behavior of deblocking filtering (S101). More specifically, loop filter 120 determines a Bs using a prediction mode of a block to be a target of a filter or a property of a motion vector. For example, Bs=2 is set when at least one of blocks across a boundary is an intra prediction block. In addition, Bs=1 is set when at least one of the following conditions (1) to (3) is satisfied: (1) at least one of blocks across a boundary includes a higher orthogonal transform coefficient; (2) the difference between motion vectors of both blocks across a boundary is larger than or equal to a threshold value; and (3) the numbers of motion vectors or reference images of both blocks across a boundary are different from each other. Bs=0 is set when none of the conditions (1) to (3) is satisfied.

Next, loop filter 120 determines whether the set Bs is larger than a first threshold value (S102). When Bs is smaller than or equal to the first threshold value (No in S102), loop filter 120 does not perform filtering (S107).

When the set Bs is larger than the first threshold value (Yes in S102), loop filter 120 calculates a pixel difference d in a boundary area, using pixel values of blocks located at both sides of a block boundary (S103). This processing is described with reference to FIG. 12. When the pixel values at the block boundary are defined as in FIG. 12, loop filter 120 calculates, for example, $d=|p30-2\times p20+p10|+|p33-2\times p23+p13|+|q30-2\times q20+q10|+|q33-2\times q23+q13|$.

Next, loop filter 120 determines whether the calculated d is larger than a second threshold value (S104). When the calculated d is smaller than or equal to the second threshold value (No in S104), loop filter 120 does not perform filtering (S107). It is to be noted that the first threshold value is different from the second threshold value.

When the calculated d is larger than the second threshold value (Yes in S104), loop filter 120 determines a filter characteristic (S105), and performs filtering using the determined filter characteristic (S106). For example, a 5-tap filter of (1, 2, 2, 2, 1)/8 is used. Specifically, for p10 indicated in FIG. 12, a calculation of (1×p30+2×p20+2×p10+2×q10+1×q20)/8 is performed. Here, in the filtering, clipping is performed so that variation falls within a certain range without excessive smoothing. Clipping here is threshold processing which, for example, when a threshold value for clipping is tc and a pixel value to be filtered is q, only allows the filtered pixel value to take a value within the range of q±tc.

Hereinafter, a description is given of an example of applying an asymmetrical filter across a block boundary in deblocking filtering performed by loop filter 120 according to this embodiment.

Figure 13:
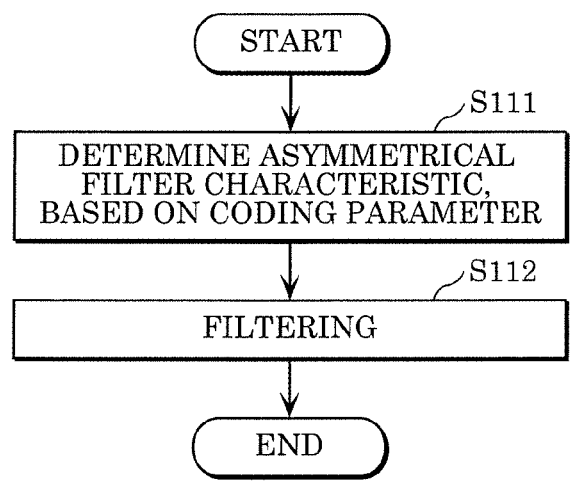
FIG. 13 is a flowchart of deblocking filtering according to Embodiment 1.

FIG. 13 is a flowchart indicating an example of deblocking filtering according to this embodiment. It is to be noted that the processing indicated in FIG. 13 may be performed for each block boundary, or for each unit of one or more pixels.

First, loop filter 120 obtains a coding parameter, and determines an asymmetrical filter characteristic across a boundary, using the obtained coding parameter (S111). In the present disclosure, the obtained coding parameter is assumed to, for example, characterize an error distribution.

Here, filter characteristics are filter coefficients and parameters, etc. used to control filtering. In addition, a coding parameter may be any parameter which can be used to determine a filter characteristic. A coding parameter may be information indicating an error per se, or may be information or a parameter (which, for example, affects the magnitude of the error) related to the error.

In addition, hereinafter, a pixel which has been determined to have a large or small error based on a coding parameter, that is, a pixel which is more likely to have a large or small error is also simply referred to as a pixel having a large or small error.

Here, a determination process does not need to be performed each time, and a process may be performed according to a predetermined rule which associates a coding parameter and a filter characteristic.

It is to be noted that, when each pixel is seen, even a pixel which is statistically more likely to have a small error may have an error larger than an error of a pixel which is more likely to have a large error.

Next, loop filter 120 executes filtering using the determined filter characteristic (S112).

Here, a filter characteristic determined in Step S111 does not always need to be asymmetrical, and can be designed to be symmetrical. It is to be noted that, hereinafter, a filter having an asymmetrical filter characteristic across a block boundary is also referred to as an asymmetrical filter, and a filter having a symmetrical filter characteristic across a block boundary is also referred to as a symmetrical filter.

More specifically, the filter characteristic is determined considering the following two points that: a pixel determined to have a small error is less affected by a neighboring pixel having a large error; and the pixel determined to have the large error is more affected by the neighboring pixel having the small error. In other words, the filter characteristic is determined such that a pixel having a larger error is more affected by filtering. In other words, a filter characteristic is determined such that the pixel value of a pixel having a larger error is changed by a larger amount before and after filtering. In this way, as for a pixel which is more likely to have a small error, it is possible to prevent the pixel from departing from a true value by a large change in value. As for the pixel which is more likely to have the large error, it is possible to reduce the error of the pixel by changing the value after being more affected by the pixel having the small error.

It is to be noted that an element which changes variation by a filer is defined as a weight of a filter. In other words, a weight indicates a degree of influence of filtering on a current pixel. Increasing a weight means increasing influence of filtering on the pixel. In other words, increasing a weight means that a filtered pixel value is more affected by another pixel. More specifically, increasing a weight means determining a filter characteristic so that the pixel value of a pixel can be changed by a larger amount before and after filtering, or filtering is likely to be performed.

In other words, loop filter 120 increases the weight of a pixel having a larger error more significantly. It is to be noted that increasing the weight of a pixel having a larger error more significantly is not limited to changing the weight continuously and includes changing the weight stepwise. In other words, it is only necessary that the weight of a first pixel is smaller than the weight of a second pixel having a larger error than the first pixel. In addition, similar expressions are also used below.

It is to be noted that a pixel having a larger error does not need to have a larger weight in a finally determined filtering characteristic. In other words, for example, it is only necessary for loop filter 120 to change a filter characteristic which becomes a reference determined according to a conventional approach to have a tendency that a pixel having a larger error has a larger weight.

Hereinafter, a plurality of specific approaches for changing weights asymmetrically are described. It is to be noted that any of the approaches indicated below may be used, or a combination of a plurality of approaches may be used.

As a first approach, loop filter 120 decreases a filter coefficient more significantly for a pixel having a larger error. For example, loop filter 120 decreases a filter coefficient for a pixel having a large error, and increases a filter coefficient for a pixel having a small error.

Figure 12:
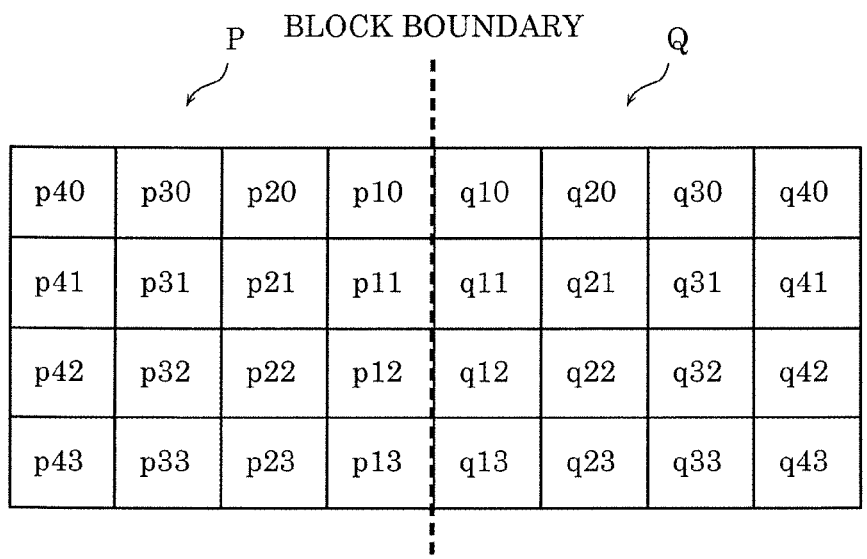
FIG. 12 is a diagram indicating an example of a pixel arrangement at a boundary according to Embodiment 1.

For example, a description is given of an example of deblocking filtering performed on pixel p1 indicated in FIG. 12. This approach is not applied hereinafter, and, for example, a filter determined according to a conventional approach is referred to as a reference filter. It is assumed that the reference filter is a 5-tap filter vertical to a block boundary, and is set for (p3, p2, p1, q1, q2). In addition, a filter coefficient is determined to be (1, 2, 2, 2, 1)/8. In addition, it is assumed that an error of block P is more likely to be large, and that an error of block Q is more likely to be small. In this way, a filter coefficient is set so that block P having a large error is more affected by block Q having a small error. More specifically, a filter coefficient used for a pixel having a small error is set to be large, and a filter coefficient used for a pixel having a large error is set to be small. For example, as a filter coefficient, (0.5, 1.0, 1.0, 2.0, 1.5)/6 is used.

As another example, 0 is used as a filter coefficient for a pixel having a small error. For example, (0, 0, 1, 2, 2)/5 may be used as a filter coefficient. In other words, a filter tap may be changed. A filter coefficient which is currently 0 may be set to a value other than 0. For example, (1, 2, 2, 2, 1, 1)/9 may be used as a filter coefficient. In other words, loop filter 120 may increase the number of filter taps at a small error side.

It is to be noted that a reference filter is not a filter which is horizontally symmetrical about a current pixel as in the case of (1, 2, 2, 2, 1)/8 described above. In such a case, loop filter 120 further adjusts the filter. For example, the filter coefficient for a reference filter to be used for a left-end pixel in block Q is (1, 2, 3, 4, 5)/15, and the filter coefficient for a reference filter to be used for a right-end pixel in block P is (5, 4, 3, 2, 1)/15. In other words, in this case, the reverse-landscape filter coefficients are used between the pixels across the block boundary. Such a filter characteristic which is reverse-symmetrical across a block boundary can be said to be "a filter characteristic which is symmetrical across a block boundary". In other words, a filter characteristic which is asymmetrical across a block boundary is a filter characteristic which is not reverse-symmetrical across a block boundary.

In addition, similarly to the above, when block P has a large error and block Q has a small error, loop filter 120 changes, for example, (5, 4, 3, 2, 1)/15 which is the filter coefficient for a reference filter to be used for a right-end pixel in block P to (2.5, 2.0, 1.5, 2.0, 1.0)/9.

In this way, in deblocking filtering, a filter having filter coefficients which change asymmetrically across a block boundary are used. For example, loop filter 120 determines a reference filter having filter coefficients which are symmetrical across a boundary according to a predetermined reference. Loop filter 120 changes the reference filter to have filter coefficients which are asymmetrical across a boundary. More specifically, loop filter 120 performs at least one of: increasing a filter coefficient of at least one pixel having a small error among the filter coefficients of the reference filter; and decreasing a filter coefficient of at least one pixel having a large error among the filter coefficients of the reference filter.

Next, a second approach for changing weights asymmetrically is described. First, loop filter 120 performs a filter calculation using a reference filter. Next, loop filter 120 performs asymmetrical weighting across a block boundary onto reference change amount $\Delta 0$ which is the amount of change in pixel value before and after the filter calculation using a reference filter. It is to be noted that, hereinafter, for distinction, processing using a reference filter is referred to as a filter calculation, and sequential processing including a filter calculation and subsequent correction (for example, asymmetrical weighting) is referred to as filtering (deblocking filtering).

For example, in the case of a pixel having a small error, loop filter 120 calculates corrected change amount $\Delta 0$ by multiplying reference change amount $\Delta 0$ with a coefficient smaller than 1. In addition, in the case of a pixel having a large error, loop filter 120 calculates a corrected change amount $\Delta 0$ by multiplying reference change amount $\Delta 0$ with a coefficient larger than 1. Next, loop filter 120 generates a filtered pixel value by adding a pixel value before a filter calculation to corrected change amount $\Delta 1$. It is to be noted that loop filter 120 may perform only one of processing on the pixel having a small error and processing on the pixel having a large error.

For example, similarly to the above, it is assumed that block P has a large error and block Q has a small error. In this case, in the case of a pixel included in block Q having a small error, loop filter 120 calculates corrected change amount $\Delta 1$ by, for example, multiplying reference change amount $\Delta 0$ by 0.8. In addition, in the case of a pixel included in block P having a large error, loop filter 120 calculates corrected change amount $\Delta 1$ by, for example, multiplying reference change amount $\Delta 0$ by 1.2. In this way, it is possible to decrease variation in pixel value having a small error. In addition, it is possible to increase variation in pixel value having a large error.

It is to be noted that 1:1 may be selected as a ratio between a coefficient that is multiplied with reference change amount $\Delta 0$ of a pixel having a small error and a coefficient that is multiplied with reference change amount $\Delta 0$ having a large error. In this case, the filter characteristic is symmetrical across a block boundary.

In addition, loop filter 120 may calculate a coefficient that is multiplied with reference change amount $\Delta 0$ by multiplying the reference coefficient by a constant. In this case, loop filter 120 uses a larger constant for a pixel having a large error than a constant for a pixel having a small error. As a result, the change amount in pixel value of the pixel having the large error increases, and the change amount in pixel value of the pixel which is more likely to have the small error decreases. For example, loop filter 120 uses 1.2 or 0.8 as a constant for a pixel that neighbors a block boundary, and uses 1.1 or 0.9 as a constant for a pixel that is apart by one pixel from the pixel that neighbors the block boundary. In addition, a reference coefficient is calculated according to, for example, $(A \times (q1-p1) - B \times (q2-p2)+C)/D$. Here, A, B, C, and D are constants. For example, A=9, B=3, C=8, and D=16 are satisfied. In addition, p1, p2, q1, and q2 are pixel values of pixels located across a block boundary and are in a positional relationship indicated in FIG. 12.

Next, a third approach for changing weights asymmetrically is described. Loop filter 120 performs a filter calculation using a filter coefficient of a reference filter similarly to the second approach. Next, loop filter 120 adds asymmetrical offset values to pixel values after being subjected to the filter calculation across a block boundary. More specifically, loop filter 120 adds a positive offset value to a pixel value of a pixel having a large error so that the value of the pixel having the large error is made closer to the value of pixel which is more likely to have a small error and the variation of the pixel having the large error becomes large. In addition, loop filter 120 adds a negative offset value to the pixel value of the pixel having the small error so that the value of the pixel having the small error is not made closer to the value of the pixel having the large error and the variation of the pixel having the small error becomes small. As a result, the change amount in pixel value of the pixel having the large error increases, and the change amount in pixel value of the pixel having the small error decreases. It is to be noted that loop filter 120 may perform only one of processing on the pixel having a small error and processing on the pixel having a large error.

For example, for a pixel included in a block having a large error, loop filter 120 calculates corrected change amount $\Delta 1$ by adding a positive offset value (for example, 1) to the absolute value of reference change amount $\Delta 0$. In addition, for a pixel included in a block having a small error, loop filter 120 calculates corrected change amount $\Delta 1$ by adding a negative offset value (for example, −1) to the absolute value of reference change amount $\Delta 0$. Next, loop filter 120 generates a filtered pixel value by adding corrected change amount $\Delta 1$ to the pixel value before being subjected to the filter calculation. It is to be noted that loop filter 120 may add an offset value to the filtered pixel value instead of adding an offset value to a change amount. In addition, the offset values may not be symmetrical across a block boundary.

In addition, when a filter tap is set for a plurality of pixels neighboring a block boundary, loop filter 120 may change only the weights for particular pixels or may change the weights for all the pixels. In addition, loop filter 120 may change the weights of the target pixels according to the distances from the block boundary to the target pixels. For example, loop filter 120 may make filter coefficients for two pixels from a block boundary asymmetrical, and make the other filter coefficients for subsequent pixels symmetrical. In addition, filter weights may be common to a plurality of pixels, or may be set for each pixel.

Next, a fourth approach for changing weights asymmetrically is described. Loop filter 120 performs a filter calculation using a filter coefficient of a reference filter. Next, when a change amount Δ in pixel value before and after the filter calculation exceeds a clip width which is a reference value, loop filter 120 clips the change amount Δ to the clip width. Loop filter 120 sets asymmetrical clip widths across a block boundary.

Specifically, loop filter 120 makes a clip width for a pixel having a large error wider than the clip width of a pixel having a small error. For example, loop filter 120 makes the clip width for the pixel having the large error to a constant multiple of the clip width for the pixel having the smaller error. As a result of changing the clip width, the value of the pixel having the small error is prohibited from changing significantly. In addition, the value of the pixel having the large error is allowed to change significantly.

It is to be noted that loop filter 120 may adjust the absolute values of the clip widths instead of specifying a clip width ratio. For example, loop filter 120 fixes the clip width for a pixel having a large error at a multiple of a predetermined reference clip width. Loop filter 120 sets the ratio between the clip width for the pixel having the large error and the clip width for a pixel having a small error to 1.2:0.8. Specifically, for example, it is assumed that the reference clip width is 10, and that the change amount Δ before and after a filter calculation is 12. In this case, in the case where the reference clip width is used as it is, the change amount Δ is corrected to 10 by threshold processing. In the opposite case where a target pixel is a pixel having a large error, the reference clip width is multiplied by, for example, 1.5. In this way, since the clip width becomes 15, no threshold processing is performed, and the change amount Δ is 12.

Next, a fifth approach for changing weights asymmetrically is described. Loop filter 120 sets an asymmetrical condition for determining whether to perform filtering across a block boundary. Here, the condition for determining whether to perform filtering is, for example, a first threshold value or a second threshold value indicated in FIG. 11.

More specifically, loop filter 120 sets a condition for increasing the likeliness of filtering on a pixel having a large error and a condition for decreasing the likeliness of filtering on a pixel having a small error. For example, loop filter 120 sets a higher threshold value for a pixel having a small error than a threshold value for a pixel having a large error. For example, loop filter 120 sets the threshold value for the pixel having the small error to be a constant multiple of the threshold value for the pixel having the large error.

In addition, loop filter 120 may adjust the absolute values of the threshold values not only specifying the threshold value ratio. For example, loop filter 120 may fix a threshold value for a pixel having a small error to a multiple of a predetermined reference threshold value, and may set the ratio between the threshold value for the pixel having the small error and a threshold value for a pixel having a large error to be 1.2:0.8.

Specifically, it is assumed that a reference threshold value for a second threshold value in Step S104 is 10, and that the d calculated from the pixel value in a block is 12. In the case where the reference threshold value is used as the second threshold value as it is, it is determined that filtering is performed. In the opposite case where a target pixel is a pixel having a small error, for example, a value obtained by multiplying the reference threshold value by 1.5 is used as the second threshold value. In this case, the second threshold value becomes 15 which is larger than d. In this way, it is determined that no filtering is performed.

In addition, constants, etc. indicating weights based on errors used in the above-described first to fifth approaches may be values predetermined in encoder 100 and decoder 200, or may be variable. Specifically, these constants include: a filter coefficient or a coefficient that is multiplied with a filter coefficient of a reference filter in the first approach; a coefficient that is multiplied with reference change amount Δ0 or a constant that is multiplied with a reference coefficient in the second approach; an offset value in the second approach; a clip width or a constant multiplied with a reference clip width in the fourth approach; and a threshold value or a constant that is multiplied with a reference threshold value in the fifth approach.

When a constant is variable, information indicating the constant may be included in a bitstream as a parameter in units of a sequence or a slice, and may be transmitted from encoder 100 to decoder 200. It is to be noted that the information indicating the constant may be information indicating the constant as it is, or may be information indicating a ratio with or a difference from a reference value.

In addition, according to errors, as methods for changing coefficients or constants, for example, there are a method for changing them linearly, a method for changing them quadratically, a method for changing them exponentially, a method using a look-up table indicating the relationships between errors and constants, or other methods.

In addition, when an error is larger than or equal to a reference, or when an error is smaller than or equal to a reference, a fixed value may be used as a constant. For example, loop filter 120 may set a variable to a first value when an error is below a predetermined range, may set a variable to a second value when an error is above the predetermined range, or may change a variable to a continuous variable according to an error, in a range from the first value to the second value when the error is within the predetermined range.

In addition, when an error exceeds a predetermined reference, loop filter 120 may use a symmetrical filter (reference filter) without using an asymmetrical filter.

In addition, in the case of using a look-up table, etc, loop filter 120 may hold tables for both a case where an error is large and a case where an error is small, or may hold only one of the tables and may calculate a constant for the other according to a rule predetermined based on the content of the table.

As described above, encoder 100 and decoder 200 according to this embodiment are capable of reducing errors in a reconstructed image by using an asymmetrical filter, and thereby increasing coding efficiency.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 2

Embodiments 2 to 6 describe specific examples of coding parameters which characterize the above-described error distributions. In this embodiment, loop filter 120 determines a filter characteristic according to the position of a current pixel in a block.

Figure 14:
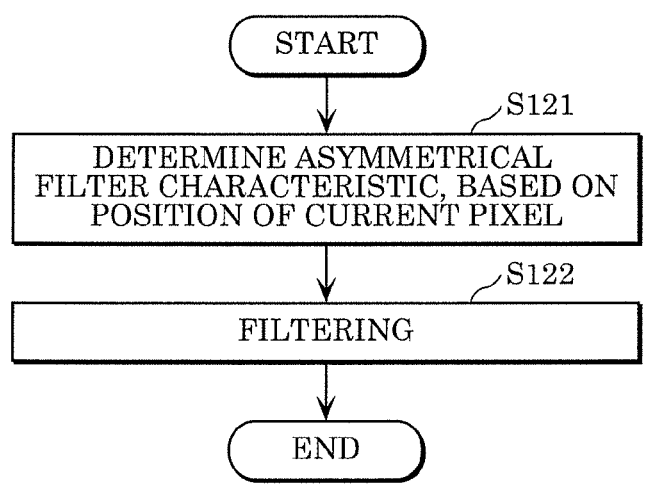
FIG. 14 is a flowchart of deblocking filtering according to Embodiment 2.

FIG. 14 is a flowchart indicating an example of deblocking filtering according to this embodiment. First, loop filter 120 obtains information indicating the position of the current pixel in a block, as a coding parameter which characterizes an error distribution. Loop filter 120 determines an asymmetrical filter characteristic across a block boundary based on the position (S121).

Next, loop filter 120 executes filtering using the determined filter characteristic (S122).

Here, a pixel distant from a reference pixel in intra prediction is more likely to have a large error than a pixel close to the reference pixel in intra prediction. Accordingly, loop filter 120 determines the filter characteristic so that the pixel value of the pixel more distant from the reference pixel in intra prediction changes by a larger change amount before and after filtering.

Figure 15:
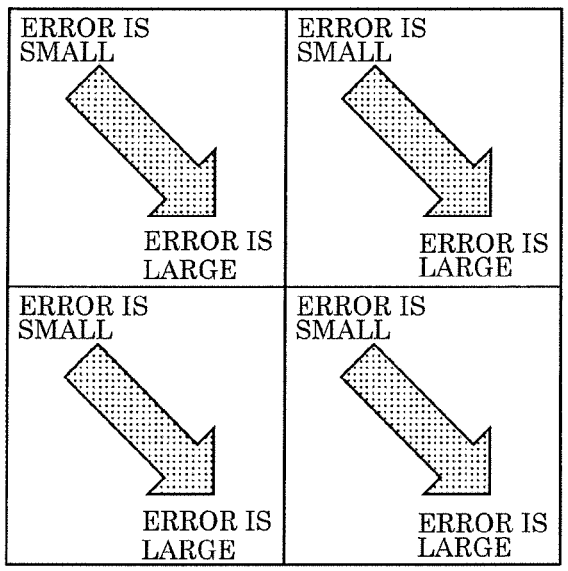
FIG. 15 is a diagram indicating relationships between pixel positions and errors in blocks according to Embodiment 2.

For example, in the case of H.265/HEVC or JEM, as indicated in FIG. 15, a pixel close to a reference pixel is a pixel present at an upper-left part of a block, and a pixel distant from a reference pixel is a pixel present at a lower-right part of the block. Accordingly, loop filter 120 determines the filter characteristic so that the weight for the lower-right pixel in the block becomes larger than the weight for the upper-left pixel.

Specifically, loop filter 120 determines the filter characteristic so that the pixel distant from the reference pixel in intra prediction is more affected by filtering as described in Embodiment 1. In other words, loop filter 120 increases the weight for the pixel distant from the reference pixel in intra prediction. Here, as described above, increasing a weight is performing at least one of; (1) decreasing a filter coefficient; (2) increasing a filter coefficient for a pixel across a boundary (that is, a pixel close to a reference pixel in intra prediction); (3) increasing a coefficient which is multiplied with a change amount; (4) increasing an offset value for a change amount; (5) increasing a clip width; and (6) changing a threshold value so as to increase the likeliness of filtering. As for the pixel close to the reference pixel in intra prediction, loop filter 120 determines a filter characteristic so that the pixel is less affected by filtering. In other words, loop filter 120 decreases the weight for the pixel close to the reference pixel in intra prediction. Here, as described above, decreasing a weight is performing at least one of: (1) increasing a filter coefficient; (2) decreasing a filter coefficient for a pixel across a boundary (that is, a pixel close to a reference pixel in intra prediction); (3) decreasing a coefficient which is multiplied with a change amount; (4) decreasing an offset value for a change amount; (5) decreasing a clip width; and (6) changing a threshold value so as to decrease the likeliness of filtering.

It is to be noted that the above processing may be performed when intra prediction is used, and may not by performed for a block for which inter prediction is used. However, since the property of an intra prediction block may have an influence in inter prediction, the above-described processing may be performed also on an inter prediction block.

In addition, loop filter 120 may change weights by arbitrarily specifying positions in a particular block. For example, loop filter 120 may increase the weight of a lower-right pixel in a block and decrease the weight of an upper-left pixel in the block as described above. It is to be noted that loop filter 120 may change weights by arbitrarily specifying positions other than the upper-left and lower-right positions in the particular block.

In addition, as indicated in FIG. 15, left-side blocks have a large error and right-side blocks have a small error at the boundaries of horizontally neighboring blocks. Thus, loop filter 120 may increase the weights for the left-side blocks and decrease the weights for the right-side blocks at the boundaries of horizontally neighboring blocks.

Likewise, at the boundaries of vertically neighboring blocks, upper-side blocks have a large error, and lower-side blocks have a small error. Thus, loop filter 120 may increase the weights for the upper-side blocks and decrease the weights for the lower-side blocks at the boundaries of vertically neighboring blocks.

In addition, loop filter 120 may change weights according to the distances from a reference pixel in intra prediction. In addition, loop filter 120 may determine weights in units of a block boundary, or may determine weights in units of a pixel. Errors are likely to be large with increase in distance from a reference pixel. Thus, loop filter 120 determines a filter characteristic so that the gradient of weights becomes sharp with increase in distance from the reference pixel. In addition, loop filter 120 determines the filter characteristic so that the weight gradient in the upper side of the right side of a block is gentler than the weight gradient in the lower side thereof.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 3

In this embodiment, loop filter 120 determines a filter characteristic according to an orthogonal transform basis.

Figure 16:
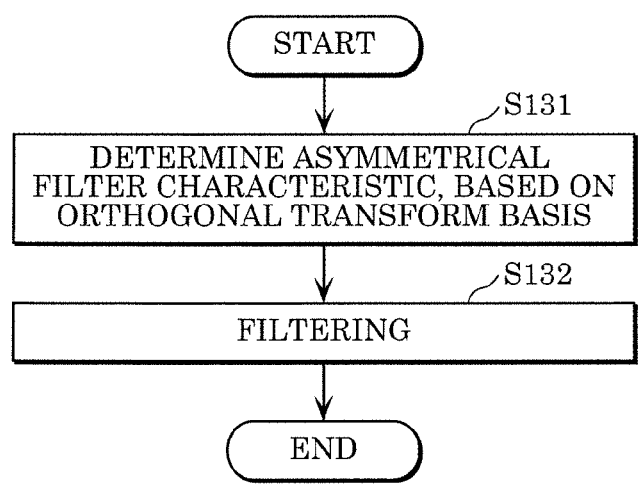
FIG. 16 is a flowchart of deblocking filtering according to Embodiment 3.

FIG. 16 is a flowchart indicating an example of deblocking filtering according to this embodiment. First, loop filter 120 obtains information indicating orthogonal transform basis used for a current block, as a coding parameter which characterizes an error distribution. Loop filter 120 determines an asymmetrical filter characteristic across a block boundary based on the orthogonal transform basis (S131).

Next, loop filter 120 executes filtering using the determined filter characteristic (S132).

Figure 17:
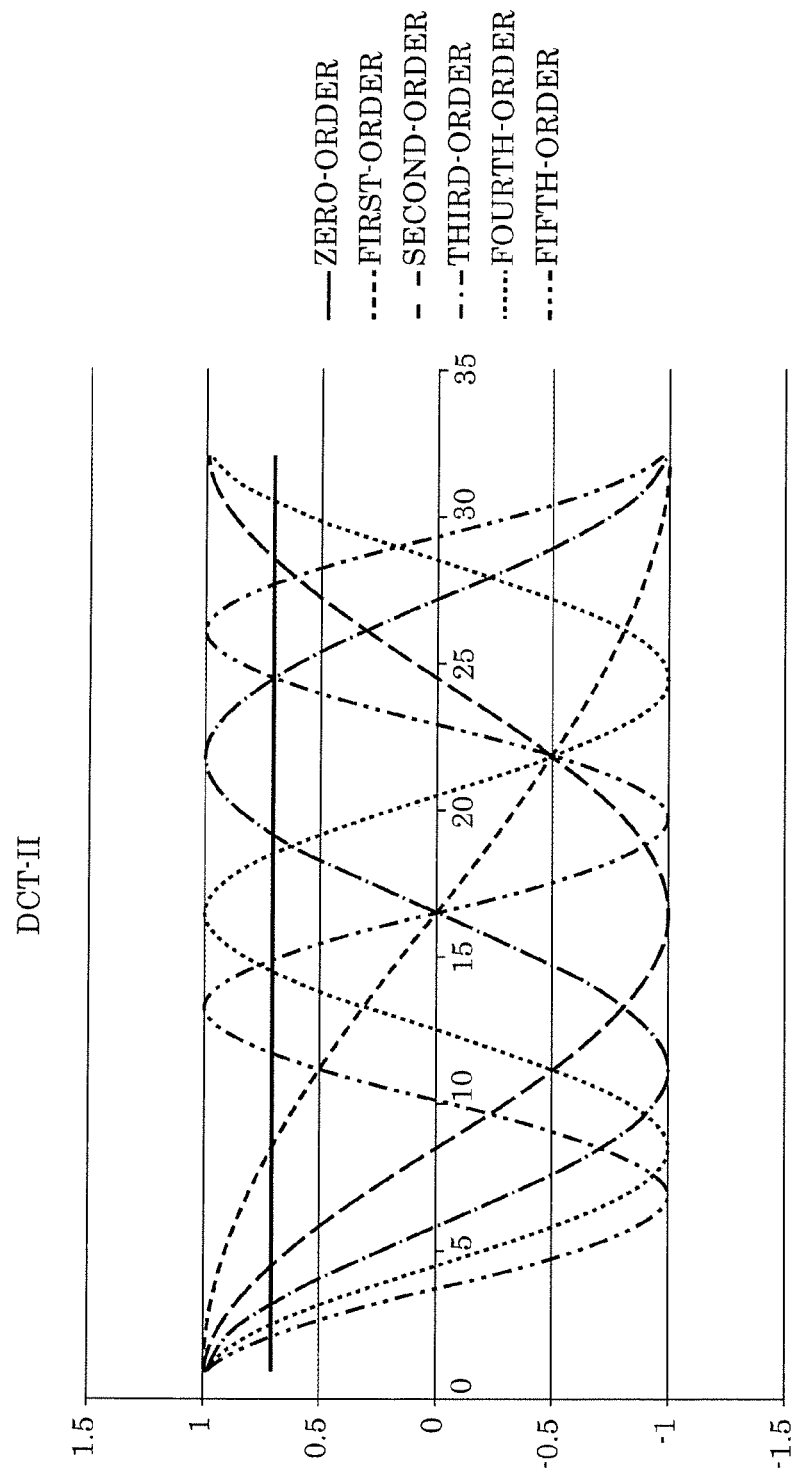
FIG. 17 is a diagram indicating DCT-II transform basis according to Embodiment 3.
Figure 18:
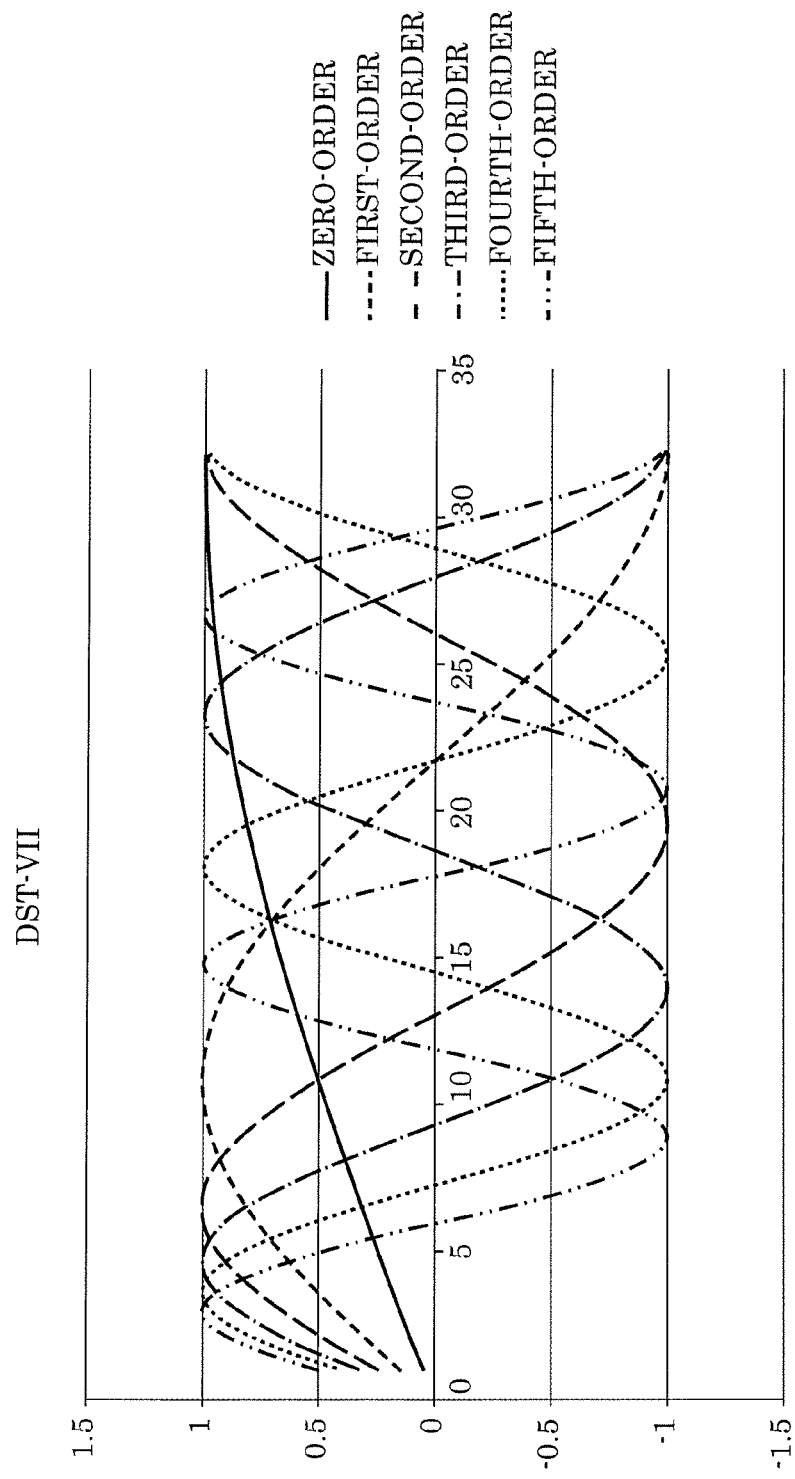
FIG. 18 is a diagram indicating DST-VII transform basis according to Embodiment 3.

Encoder 100 selects an orthogonal transform basis which is a transform basis at the time when orthogonal transform is performed, from a plurality of candidates. The plurality of candidates include, for example, a flat basis whose zero-order transform basis is flat such as DCT-II, or the like, and a basis whose zero-order transform basis is not flat such as DST-VII, or the like. FIG. 17 is a diagram indicating a DCT-II transform basis. FIG. 18 is a diagram indicating a DCT-VII transform basis.

The zero-order basis in DCT-II is constant regardless of the positions in a block. In other words, when DCT-II is used, errors in the blocks are constant. Thus, when both blocks across a block boundary have been transformed using DCT-II, loop filter 120 performs filtering using a symmetrical filter without using an asymmetrical filter.

In contrast, the value of the zero-order basis in DST-VII becomes large with increase in distance from a left or upper block boundary. In other words, errors are more likely to be large with increase in distance from the left or upper block boundary. Thus, loop filter 120 uses an asymmetrical filter when at least one of the two blocks across a block boundary has been transformed using DST-VII. Specifically, loop filter 120 determines a filter characteristic so that a pixel having a smaller value of a lower-order (for example, zero-order) basis in a block is less affected by filtering.

More specifically, when both blocks across a block boundary have been transformed using DST-VII, loop filter 120 determines the filter characteristic so that a lower-right pixel in the block is more affected by filtering according to the above-described approach. In addition, loop filter 120 determines the filter characteristic so that an upper-left pixel in the block is less affected by filtering.

In addition, also when a block for which DST-VII has been used and a block for which DCT-II has been used neighbor vertically, loop filter 120 determines a filter characteristic so that a filter weight for a pixel in the lower part of the upper block for which DST-VII has been used and which neighbors a block boundary becomes larger than a filter weight for a pixel in the upper part of the lower block for which DCT-II has been used and which neighbors the block boundary. However, the difference in the amplitude of a low-order basis in this case is smaller than the difference in the amplitude of the lower-order basis when blocks for which DST-VII has been used neighbor each other. Thus, loop filter 120 sets a filter characteristic so that the weight gradient in this case becomes smaller than the weight gradient in the case where blocks for which DST-VII has been used neighbor each other. For example, loop filter 120 sets the weights in the case where a block for which DCT-II has been used and a block for which DCT-II has been used neighbor vertically to 1:1 (a symmetrical filter), the weights in the case where a block for which DST-VII has been used and a block for which DST-VII has been used neighbor vertically to 1.3:0.7, and the weights in the case where a block for which DST-VII has been used and a block for which DCT-II has been used neighbor vertically to 1.2:0.8.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 4

In this embodiment, loop filter 120 determines a filter characteristic according to the pixel values of pixels across a block boundary.

Figure 19:
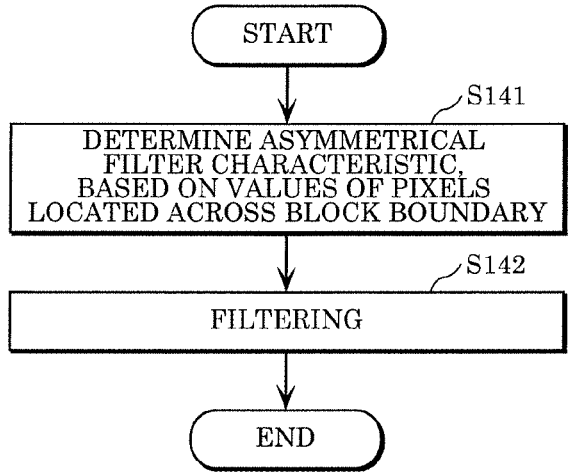
FIG. 19 is a flowchart of deblocking filtering according to Embodiment 4.

FIG. 19 is a flowchart indicating an example of deblocking filtering according to this embodiment. First, loop filter 120 obtains information indicating the pixel values of pixels in blocks across a boundary, as a coding parameter which characterizes an error distribution. Loop filter 120 determines an asymmetrical filter characteristic across the block boundary based on the pixel values (S141).

Next, loop filter 120 executes filtering using the determined filter characteristic (S142).

For example, loop filter 120 increases the difference in filter characteristic across a block boundary with increase in difference d0 in pixel value. Specifically, loop filter 120 determines a filter characteristic so that the difference in influence by filtering becomes large. For example, loop filter 120 sets weights to 1.4:0.6 when d0>(quantization parameter)×(constant) is satisfied, and sets weights to 1.2:0.8 when d0>(quantization parameter)×(constant) is not satisfied. In other words, loop filter 120 compares difference d0 in pixel value and a threshold value based on a quantization parameter, and when difference d0 in pixel value is larger than the threshold value, increases the difference in filter characteristic across the block boundary so that the difference becomes larger than when difference d0 in pixel value is smaller than the threshold value.

As another example, loop filter 120 increases the difference in filter characteristic across a block boundary with increase in average value b0 of variance in pixel value in both blocks across the boundary. Specifically, loop filter 120 may determine a filter characteristic so that the difference in influence by filtering becomes large. For example, loop filter 120 sets weights to 1.4:0.6 when b0>(quantization parameter)×(constant) is satisfied, and sets weights to 1.2:0.8 when b0>(quantization parameter)×(constant) is not satisfied. In other words, loop filter 120 compares variance b0 in pixel value and a threshold value based on a quantization parameter, and when variance b0 in pixel value is larger than the threshold value, increases the difference in filter characteristic across the block boundary so that the difference becomes larger than when variance b0 in pixel value is smaller than the threshold value.

It is to be noted that the block whose weight is to be increased among neighboring blocks, that is, the block having a larger error can be identified according to the approach of Embodiment 2 or 3 described above or approaches, etc. according to Embodiment 6 to be described later. In other words, loop filter 120 determines an asymmetrical filter characteristic across a block boundary according to a predetermined rule (for example, the approach according to Embodiment 2, 3, or 6). Next, loop filter 120 changes the determined filter characteristic so that the difference in filter characteristic across the block boundary becomes large based on difference d0 in pixel values. In other words, loop filter 120 increases the ratio or difference between the weight for a pixel having a large error and the weight for a pixel having a small error.

Here, when difference d0 in pixel value is large, there is a possibility that a block boundary coincides with the edge of an object in an image. In such a case, it is possible to reduce unnecessary smoothing by decreasing the difference in filter characteristic across the block boundary.

On the contrary, it is to be noted that loop filter 120 may decrease the difference in filter characteristic across the block boundary with increase in difference d0 in pixel value. Specifically, loop filter 120 determines a filter characteristic so that the difference in influence by filtering becomes small. For example, loop filter 120 sets weights to 1.2:0.8 when d0>(quantization parameter)×(constant) is satisfied, and sets weights to 1.4:0.6 when d0>(quantization parameter)×(constant) is not satisfied. It is to be noted that the weights may be set to 1:1 (symmetrical filter) when the above relationship is satisfied. In other words, loop filter 120 compares difference d0 in pixel value and a threshold value based on a quantization parameter, and when difference d0 in pixel value is larger than the threshold value, decreases the difference in filter characteristic across the block boundary so that the difference becomes smaller than when difference d0 in pixel value is smaller than the threshold value.

For example, when difference d0 in pixel value is large, a block boundary tends to be noticeable. In such a case, it is possible to reduce weakening of smoothing by an asymmetrical filter by decreasing the difference in filter characteristic across the block boundary.

It is to be noted that these two processes may be performed at the same time. For example, loop filter 120 may use a first weight when difference d0 in pixel value is less than a first threshold value, uses a second weight for a larger difference than the difference for which the first weight is used, when difference d0 in pixel value is larger than or equal to the first threshold value and less than the second threshold value, and uses a third weight for a smaller difference than the difference for which the second weight is used, when difference d0 in pixel value is larger than or equal to the second threshold value.

In addition, difference d0 in pixel value may be the difference per se between pixel values of pixels across a boundary, or the average or variance of the differences between the pixel values of the pixels. For example, difference d0 in pixel value is calculated according to (A×(q1−p1)−B×(q2−p2)+C)/D. Here, A, B, C, and D are constants. For example, A=9, B=3, C=8, and D=16 are satisfied. In addition, p1, p2, q1, and q2 are pixel values of pixels located across a block boundary and are in a positional relationship indicated in FIG. 12.

It is to be noted that difference d0 in pixel value and weights for pixels may be set in units of a pixel, in units of a block boundary, or in units of a block group including a plurality of blocks (for example, in units of a largest coding unit (LCU)).

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 5

In this embodiment, loop filter 120 determines a filter characteristic according to an intra prediction direction and a block boundary direction.

Figure 20:
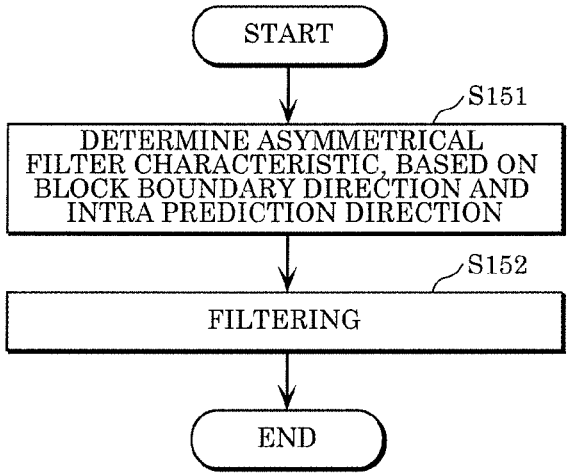
FIG. 20 is a flowchart of deblocking filtering according to Embodiment 5.

FIG. 20 is a flowchart indicating an example of deblocking filtering according to this embodiment. First, loop filter 120 obtains information indicating an angle between the intra prediction direction and the block boundary, as a coding parameter which characterizes an error distribution. Loop filter 120 determines an asymmetrical filter characteristic across a block boundary, based on the angle (S151).

Next, loop filter 120 executes filtering using the determined filter characteristic (S152).

Figure 21:
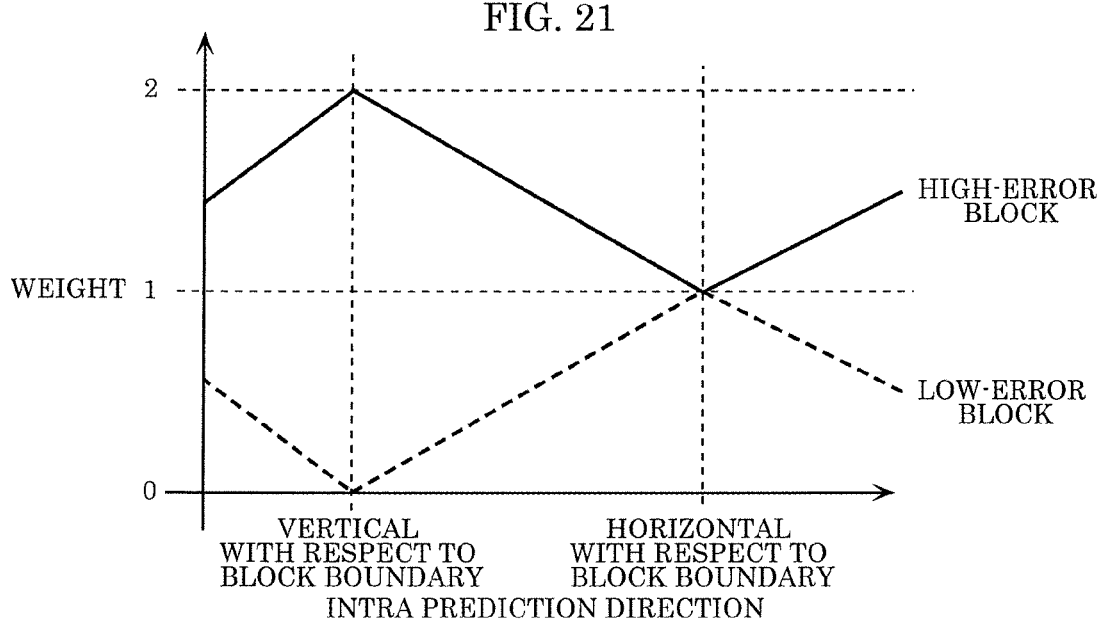
FIG. 21 is a diagram indicating examples of weights based on intra prediction directions and block boundary directions according to Embodiment 5.

Specifically, loop filter 120 increases the difference in filter characteristic across a block boundary more significantly as the angle is closer to the vertical axis, and decreases the difference in filter characteristic across a block boundary more significantly as the angle is closer to the horizontal axis. More specifically, loop filter 120 determines the filter characteristic so that the difference between filter weights for pixels at both sides across a block boundary becomes large when the intra prediction direction is close to the vertical axis relative to the block boundary, and the difference between filter weights for pixels at both sides across a block boundary becomes small when the intra prediction direction is close to the horizontal axis relative to the block boundary. FIG. 21 is a diagram indicating examples of weights for relationships between intra prediction directions and block boundary directions.

It is to be noted that the block whose weight is to be increased among neighboring blocks, that is, the block having a larger error can be identified according to the approach of Embodiment 2 or 3 described above or approaches, etc. according to Embodiment 6 to be described later. In other words, loop filter 120 determines an asymmetrical filter characteristic across a block boundary according to a predetermined rule (for example, the approach according to Embodiment 2, 3, or 6). Next, loop filter 120 changes the determined filter characteristic so that the difference in filter characteristic across the block boundary becomes large based on the intra prediction direction and the block boundary direction.

In addition, encoder 100 and decoder 200 identify the intra prediction direction using, for example, an intra prediction mode.

It is to be noted that when the intra prediction mode is Planner mode or DC mode, loop filter 120 does not always need to consider the block boundary direction. For example, when the intra prediction mode is Planar mode or DC mode, loop filter 120 may use a predetermined weight or the difference in weight regardless of the block boundary direction. Alternatively, loop filter 120 may use a symmetrical filter when the intra prediction mode is Planar mode or DC mode.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 6

In this embodiment, loop filter 120 determines a filter characteristic according to a quantization parameter indicating a quantization width.

Figure 22:
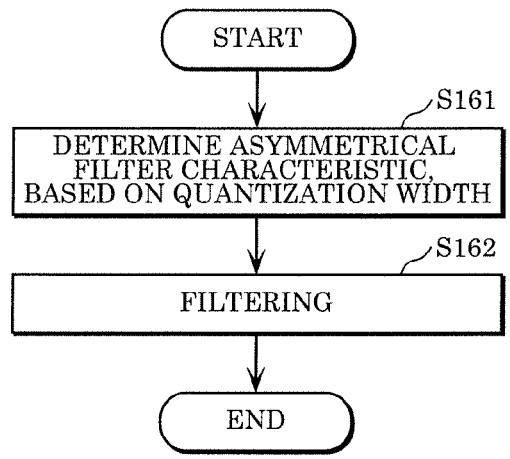
FIG. 22 is a flowchart of deblocking filtering according to Embodiment 6.

FIG. 22 is a flowchart indicating an example of deblocking filtering according to this embodiment. First, loop filter 120 obtains information indicating the quantization parameter used in the quantization of a current block, as a coding parameter which characterizes an error distribution. Loop filter 120 determines an asymmetrical filter characteristic across a block boundary, based on the quantization parameter (S161).

Next, loop filter 120 executes filtering using the determined filter characteristic (S162).

Here, an error is more likely to be large when a quantization parameter is larger. Thus, loop filter 120 determines a filter characteristic so that influence of filtering becomes large as the quantization parameter becomes larger.

Figure 23:
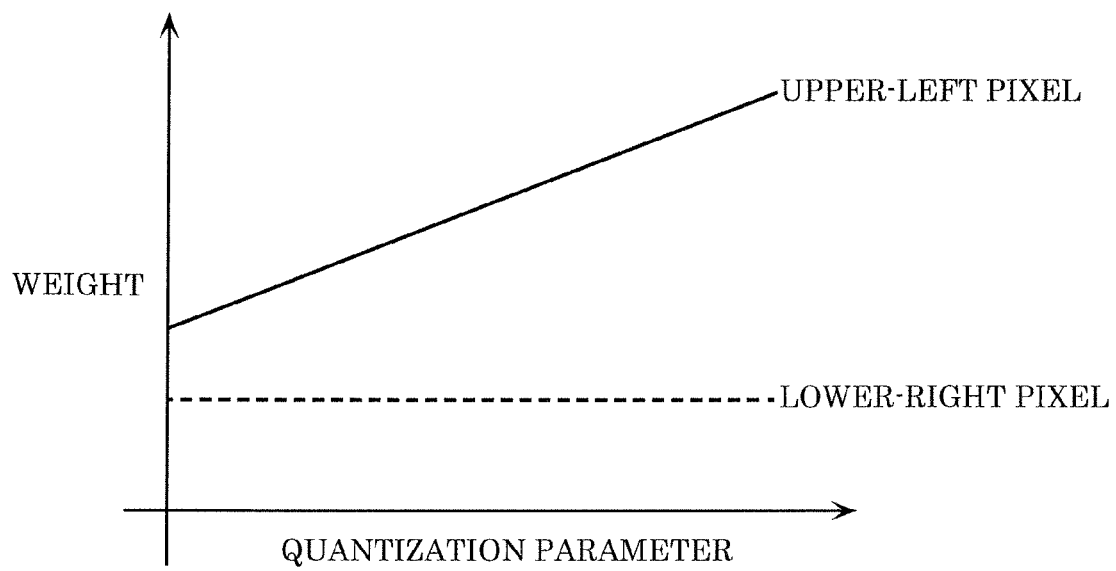
FIG. 23 is a diagram indicating examples of weights based on quantization parameters according to Embodiment 6.

FIG. 23 is a diagram indicating an example of weights for quantization parameters. As shown in FIG. 23, loop filter 120 increases the weight for the upper-left pixel in a block with increasing quantization parameter. On the contrary, loop filter 120 decreases the weight for the lower-right pixel in the block with increasing quantization parameter. In other words, loop filter 120 determines a filter characteristic so that change in influence of filtering using changing quantization parameter for the upper-left pixel becomes larger than change in influence of filtering using changing quantization parameter for the lower-right pixel.

Here, the upper-left pixel in the block is more likely to be affected by a quantization parameter than the lower-right pixel in the block. Thus, it is possible to reduce errors appropriately by performing the processing as described above.

In addition, loop filter 120 may determine, for each of two blocks across a boundary, a weight for the block based on the quantization parameter for the block, or may calculate an average value of quantization parameters for the two blocks and determine weights for the two blocks based on the average value. Alternatively, loop filter 120 may determine weights for the two blocks based on the quantization parameter for one of the blocks. For example, loop filter 120 determines a weight for the one block based on the quantization parameter for the block using the above-described approach. Next, based on the determined weight, loop filter 120 determines a weight for the other block according to a predetermined rule.

In addition, loop filter 120 may use a symmetrical filter when the quantization parameters for the two blocks are different or when the difference between the quantization parameters for the two blocks exceeds a threshold value.

In addition, in FIG. 23, although weights are set using a linear function, but an arbitrary function other than the linear function or a table may be used. For example, a curve indicating the relationships between quantization parameters and quantization steps (quantization widths) may be used.

In addition, loop filter 120 may use a symmetrical filter without using an asymmetrical filter when a quantization parameter exceeds a threshold value.

In addition, when a quantization parameter is described at a decimal accuracy, loop filter 120 may perform a calculation that is, for example, a round-off, a round-up, a cut-off, or the like onto the quantization parameter and use the quantization parameter after being subjected to the calculation in the above-described processing. Alternatively, loop filter 120 may perform the processing taking into account the decimal point level.

Although the plurality of approaches for determining errors have been described in Embodiments 2 to 6, two or more of these approaches may be combined. In this case, loop filter 120 may perform weighting on combined two or more elements.

Hereinafter, a variation is described.

Examples other than the examples of coding parameters described above may be used. For example, coding parameters may be the kind of orthogonal transform (such as Wavelet, DFT, lapped transform, or the like), a block size (the width and height of a block), a motion vector direction, the length of a motion vector, the number of reference pictures which are used in inter prediction, and information indicating a reference filter characteristic. Alternatively, these parameters may be used in combination. For example, loop filter 120 may use an asymmetrical filter only when the length of a block boundary corresponds to 16 pixels or less and a current pixel to be filtered is close to a reference pixel in intra prediction, and may use a symmetrical filter in the other cases. As another example, asymmetrical processing may be performed only when a filter of a predetermined type among a plurality of filter candidates has been used. For example, an asymmetrical processing may be used only when a variation by a reference filter is calculated according to $(A \times (q1-p1) - B \times (q2-p2) + C)/D$. Here, A, B, C, and D are constants. For example, A=9, B=3, C=8, and D=16 are satisfied. In addition, p1, p2, q1, and q2 are pixel values of pixels located across a block boundary and are in a positional relationship indicated in FIG. 12.

In addition, loop filter 120 may perform the processing on only one of a luminance signal and a chrominance signal or on the both. In addition, loop filter 120 may perform common processing or different processing on the luminance signal and the chrominance signal. For example, loop filter 120 may use different weights for the luminance signal and the chrominance signal, or may determine weights according to different rules.

In addition, various kinds of parameters for use in the above processing may be determined by encoder 100, or may be preset fixed values.

In addition, whether to perform the above processing or the details of the processing may be switched based on a predetermined unit. Examples of the predetermined unit include a slice unit, a tile unit, a wavefront dividing unit, or a CTU unit. In addition, the details of the processing are which one of the plurality of approaches described above is used, or parameters indicating weights, etc., or parameters for determining these.

In addition, loop filter 120 may limit the area in which the above processing are performed to a CTU boundary, a slice boundary, or a tile boundary.

In addition, the number of filter taps may vary between a symmetrical filter and an asymmetrical filter.

In addition, loop filter 120 may change whether to perform the above processing or the details of the processing according to a frame type (I-frame, P-frame, or B-frame).

In addition, loop filter 120 may determine whether to perform the processing or the details of the processing according to whether particular processing at a pre-stage or a post-stage has been performed.

In addition, loop filter 120 may perform different processing according to the kind of the prediction mode used for a block, or may perform the above processing only on a block for which a particular prediction mode is used. For example, loop filter 120 may perform different processing between a block for which intra prediction is used, a block for which inter prediction is used, and a merged block.

In addition, encoder 100 may encode filter information which is parameters indicating whether to perform the above processing or the details of the processing. In other words, encoder 100 may generate an encoded bitstream including filter information. This filter information may include information indicating whether to perform the above processing on a luminance signal, information indicating whether to perform the above processing on a chrominance signal, information indicating whether to change processing according to respective prediction modes, or other information.

In addition, decoder 200 may perform the above processing based on filter information included in an encoded bitstream. For example, decoder 200 may determine whether to perform the above processing or the details of the processing, based on the filter information.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 7

In each of the embodiments, each of the functional blocks can normally be implemented as an MPU, memory, or the like. In addition, the processing performed by each functional block is normally implemented by a program executor such as a processor reading and executing software (a program) recorded on a recording medium such as a ROM. The software may be distributed by download, or the like, or may be recorded on a recording medium such as a semiconductor memory and then be distributed. It is to be noted that each functional block can naturally be implemented as hardware (an exclusive circuit).

In addition, the processing described in each embodiment may be implemented by performing centralized processing using a single apparatus (system), or by performing distributed processing using a plurality of apparatuses. In addition, one or more processors may execute the program. In other words, any one of centralized processing and distributed processing may be performed.

Aspects of the present disclosure are not limited to the above examples, various modifications are possible, and these modifications, etc. may be encompassed in aspects of the present disclosure.

Furthermore, here, application examples of a video encoding method (image encoding method) or a video decoding method (image decoding method) indicated in each of the embodiments and a system using the application examples are described. The system is characterized by including an image encoder which performs an image encoding method, an image decoder which performs an image decoding method, and an image encoder and decoder which performs both an image encoding method and an image decoding method. The other constituent elements in the system can be appropriately modified according to cases.

Usage Examples

Figure 24:
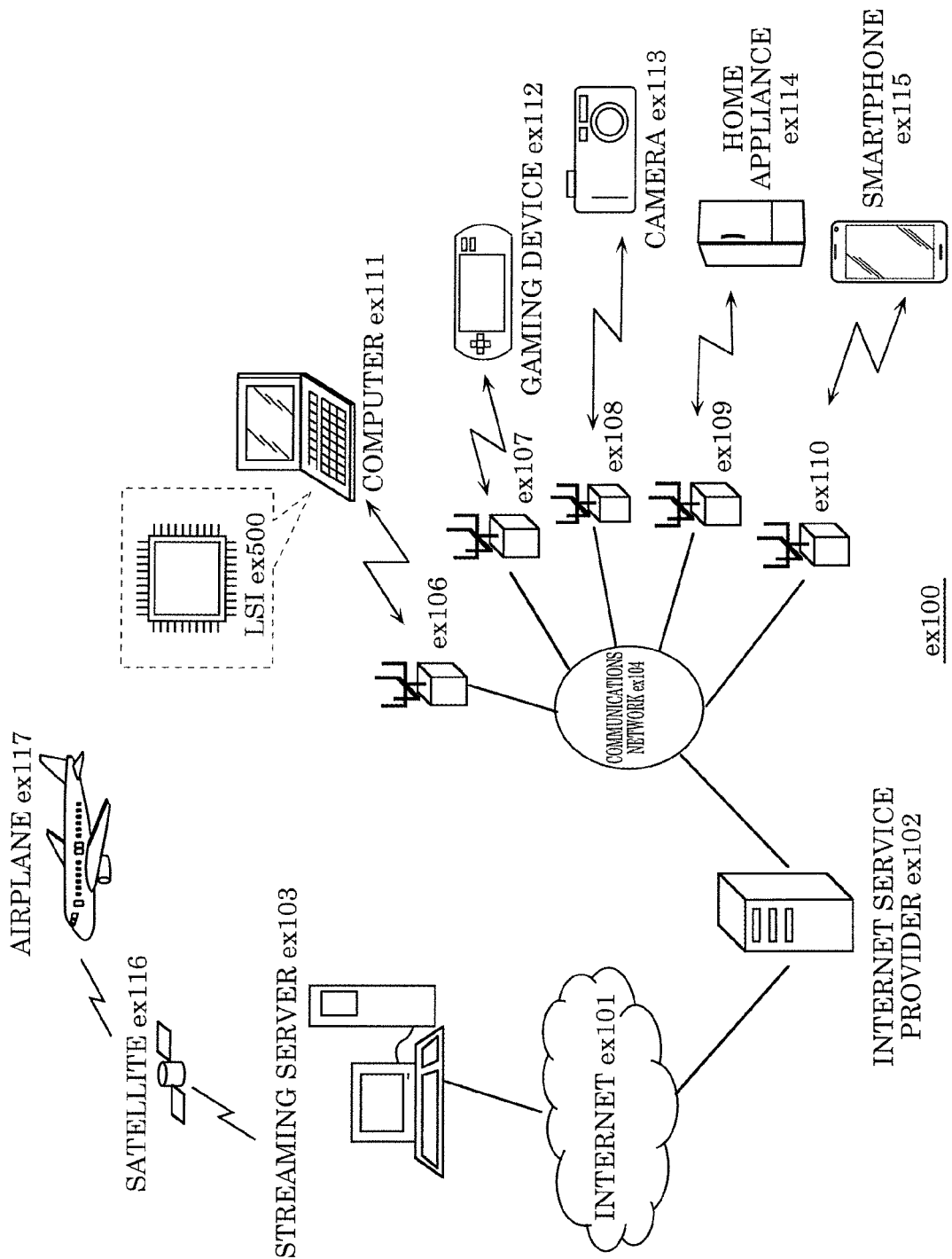
FIG. 24 illustrates an overall configuration of a content providing system for implementing a content distribution service.

FIG. 24 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an α value indicating transparency, and the server sets the α value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 25:
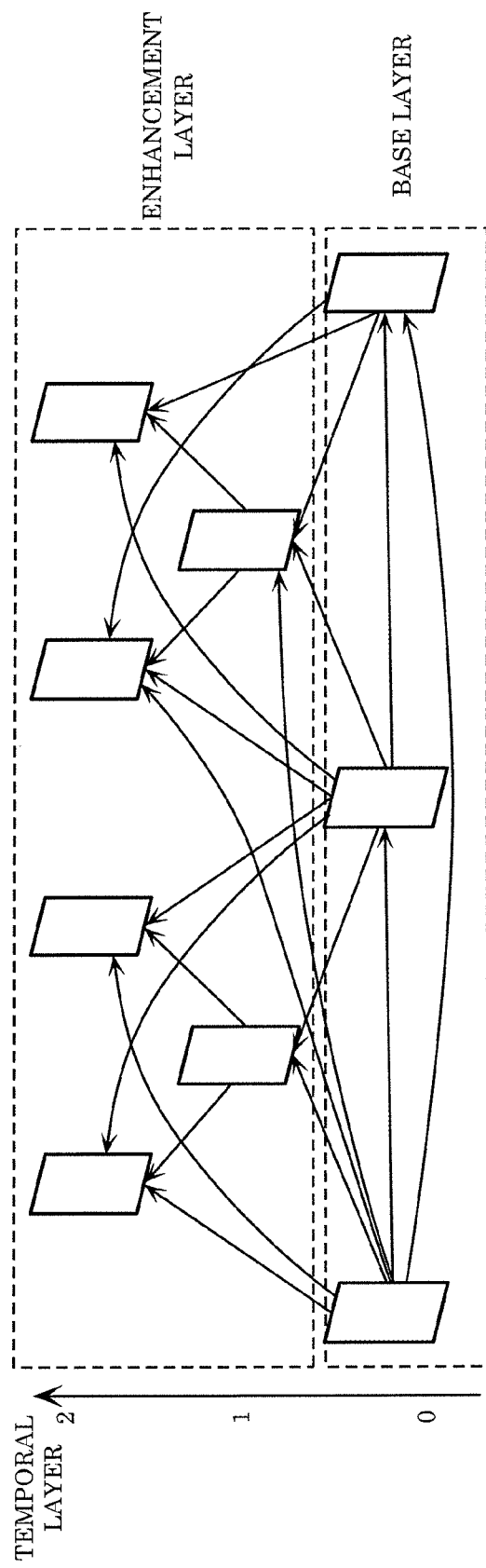
FIG. 25 illustrates one example of an encoding structure in scalable encoding

The switching of content will be described with reference to a scalable stream, illustrated in FIG. 25, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 25. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 26:
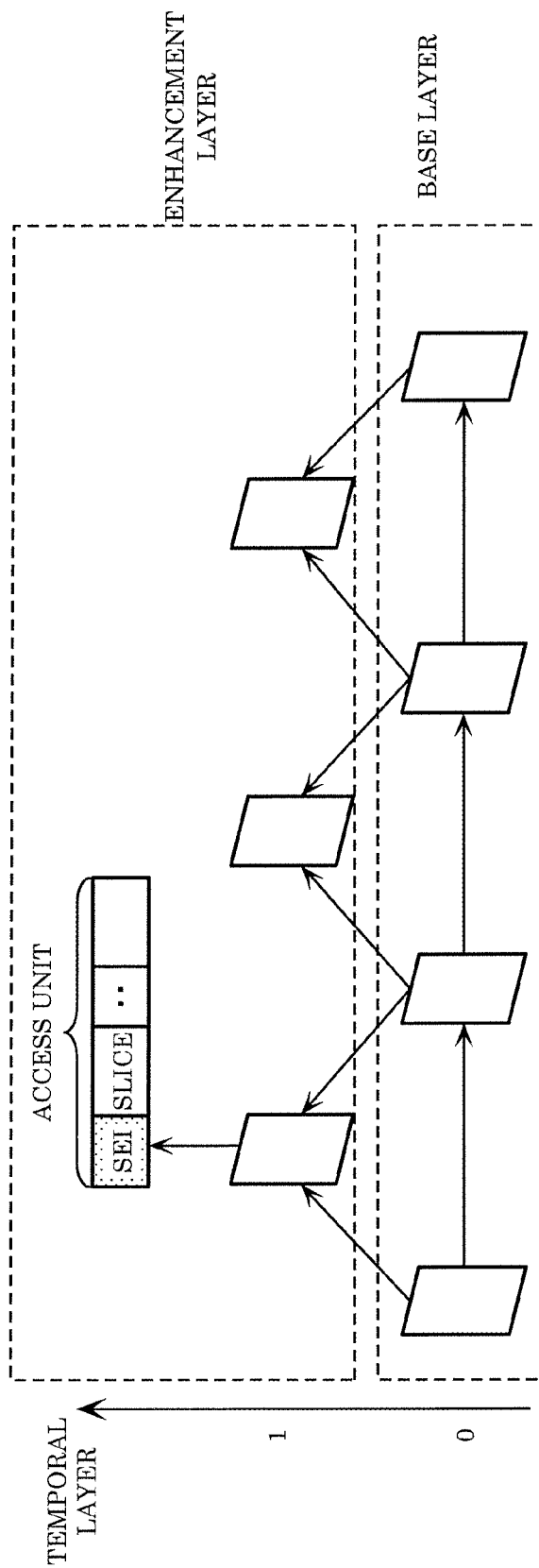
FIG. 26 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 26, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 27:
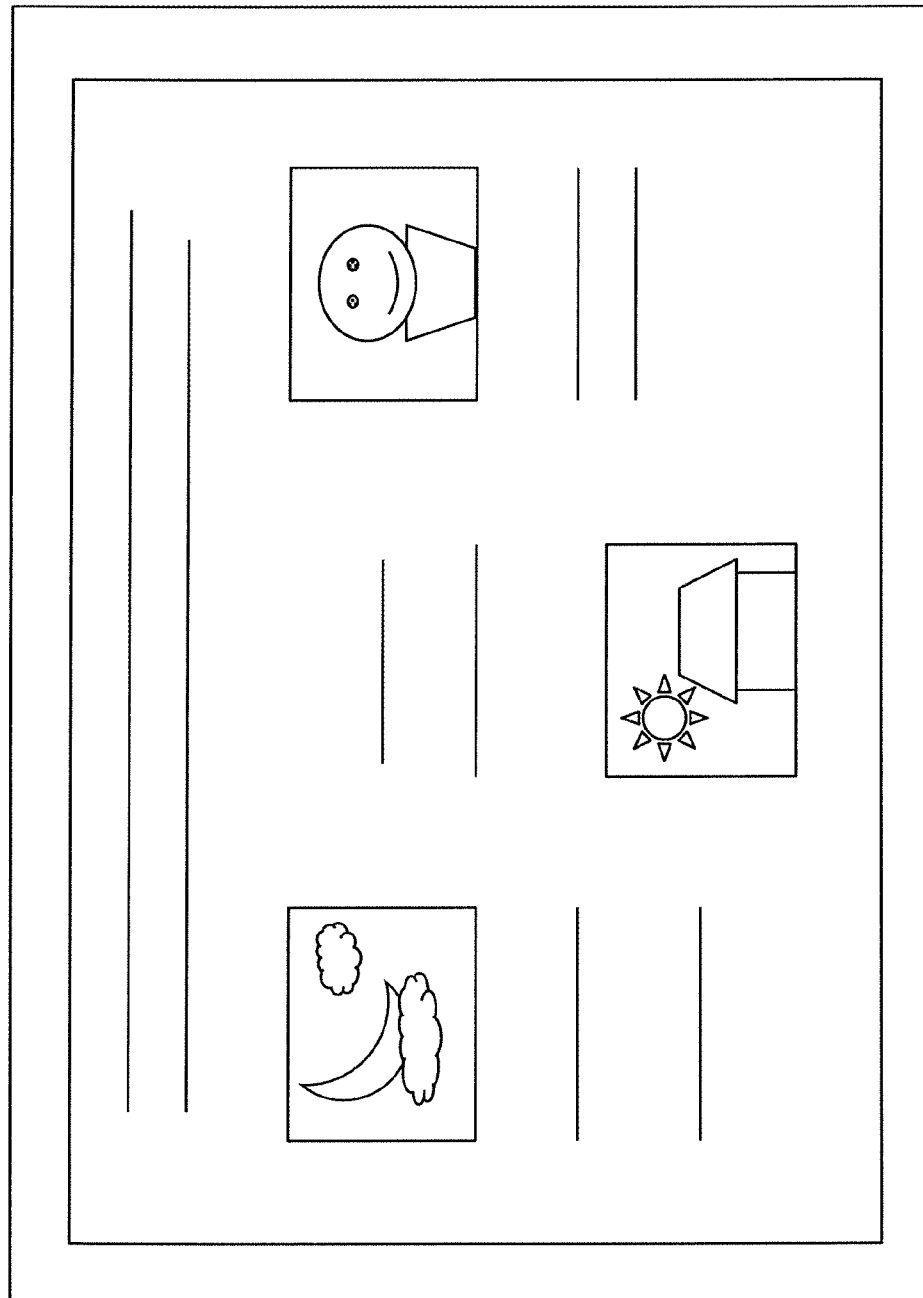
FIG. 27 illustrates an example of a display screen of a web page.
Figure 28:
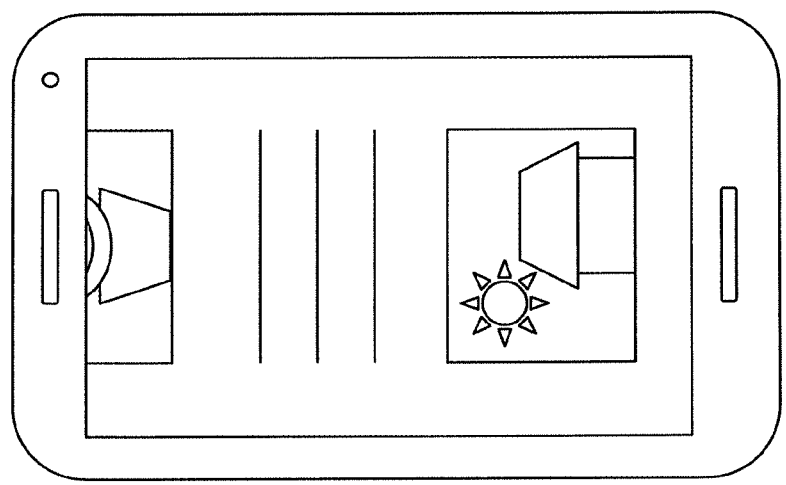
FIG. 28 illustrates an example of a display screen of a web page.

FIG. 27 illustrates an example of a display screen of a web page on, for example, computer ex111. FIG. 28 illustrates an example of a display screen of a web page on, for example, smartphone ex115. As illustrated in FIG. 27 and FIG. 28, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 29:
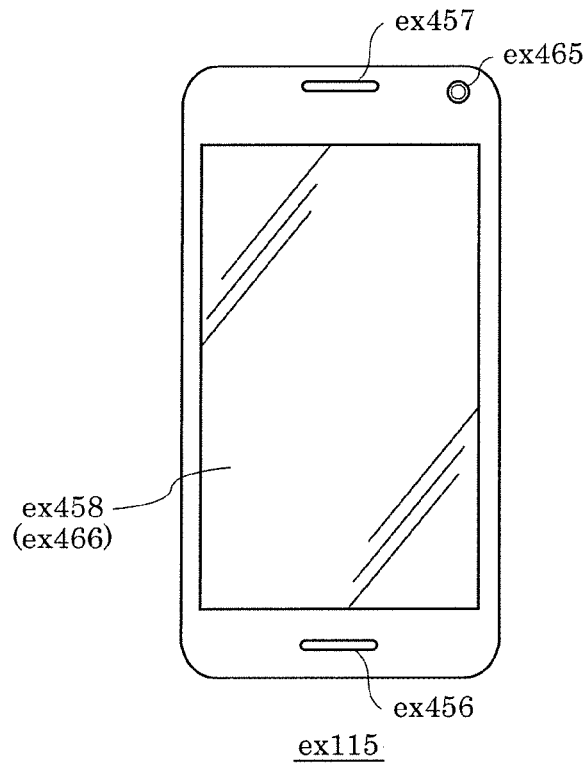
FIG. 29 illustrates one example of a smartphone.
Figure 30:
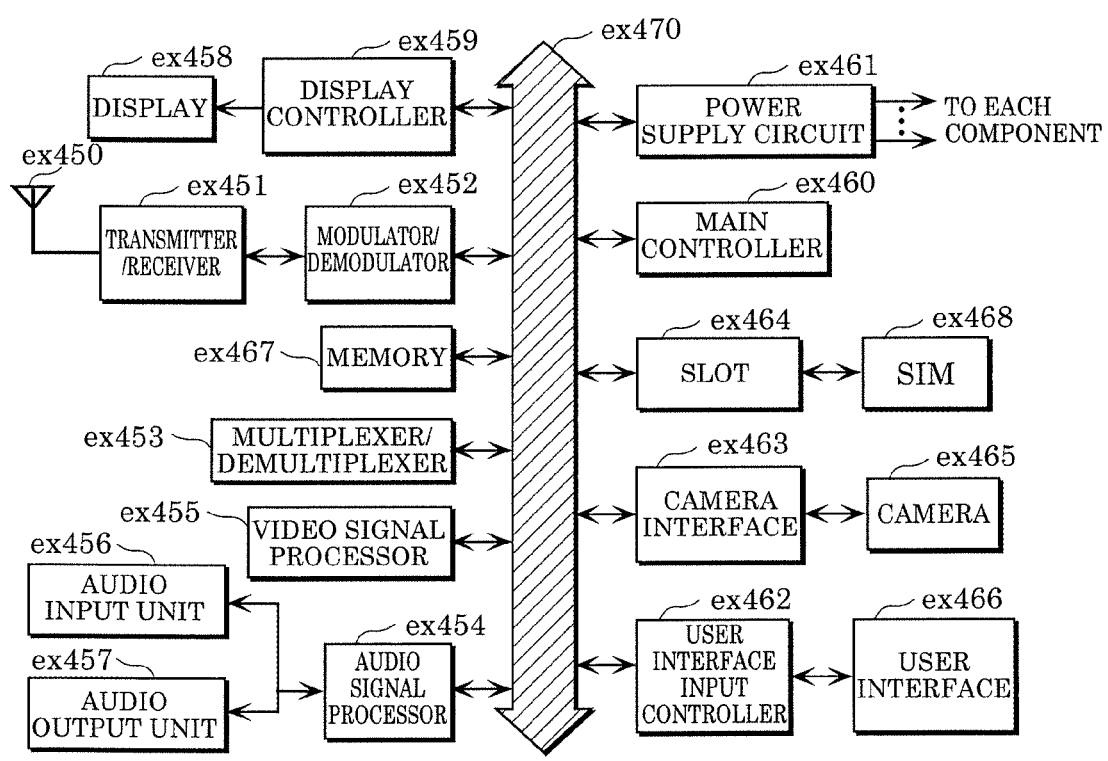
FIG. 30 is a block diagram illustrating a configuration example of a smartphone.

FIG. 29 illustrates smartphone ex115. FIG. 30 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to encoders, decoders, encoding methods, and decoding methods.

What is claimed is:

1. A decoding method comprising:
    changing values of luma pixels in a first block and a second block to filter a first boundary between the first block and the second block, using clipping such that change amounts of the respective values are within respective luma clip widths, the luma pixels in the first block and the second block being arranged along a first line across the first boundary; and
    changing values of chroma pixels in a third block and a fourth block to filter a second boundary between the third block and the fourth block, using clipping such that change amounts of the respective values are within respective chroma clip widths, the chroma pixels in the third block and the fourth block being arranged along a second line across the second boundary,
    wherein the luma clip widths applied to the luma pixels arranged along the first line are selected to be asymmetrical with respect to the first boundary, and
    wherein the chroma clip widths applied to the chroma pixels arranged along the second line are selected to be symmetrical with respect to the second boundary.

2. An encoding method comprising:
    changing values of luma pixels in a first block and a second block to filter a first boundary between the first block and the second block, using clipping such that change amounts of the respective values are within respective luma clip widths, the luma pixels in the first block and the second block being arranged along a first line across the first boundary; and
    changing values of chroma pixels in a third block and a fourth block to filter a second boundary between the third block and the fourth block, using clipping such that change amounts of the respective values are within respective chroma clip widths, the chroma pixels in the third block and the fourth block being arranged along a second line across the second boundary,
    wherein the luma clip widths applied to the luma pixels arranged along the first line are selected to be asymmetrical with respect to the first boundary, and wherein the chroma clip widths applied to the chroma pixels arranged along the second line are selected to be symmetrical with respect to the second boundary.

\* \* \* \* \*